(12) United States Patent
Stadler et al.

(10) Patent No.: US 12,521,022 B2
(45) Date of Patent: Jan. 13, 2026

(54) ACUTE HEALTH EVENT MONITORING AND ALERTING

(71) Applicant: Medtronic, Inc., Minneapolis, MN (US)

(72) Inventors: Robert W. Stadler, Shoreview, MN (US); Becky L. Dolan, Chisago, MN (US); Yong K. Cho, Excelsior, MN (US); Paul G. Krause, Mahtomedi, MN (US); Shantanu Sarkar, Roseville, MN (US); Robert C. Kowal, Excelsior, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 18/547,105

(22) PCT Filed: Feb. 16, 2022

(86) PCT No.: PCT/US2022/016502
§ 371 (c)(1),
(2) Date: Aug. 18, 2023

(87) PCT Pub. No.: WO2022/191962
PCT Pub. Date: Sep. 15, 2022

(65) Prior Publication Data
US 2024/0123238 A1 Apr. 18, 2024

Related U.S. Application Data

(60) Provisional application No. 63/158,189, filed on Mar. 8, 2021.

(51) Int. Cl.
*A61B 5/0205* (2006.01)
*A61B 5/00* (2006.01)
(Continued)

(52) U.S. Cl.
CPC .......... *A61B 5/0205* (2013.01); *A61B 5/0004* (2013.01); *A61B 5/0024* (2013.01);
(Continued)

(58) Field of Classification Search
CPC .................................................. A61B 5/0205
See application file for complete search history.

(56) References Cited

U.S. PATENT DOCUMENTS 3,552,386 A 1/1971 Horth
3,598,110 A 8/1971 Edmark
(Continued)

FOREIGN PATENT DOCUMENTS

CA 3075015 A1 9/2021
CN 105068486 A 11/2015
(Continued)

OTHER PUBLICATIONS

"Cardiac Arrest: an Important Public Health Issue," CDC, retrieved from https://www.cdc.gov/dhdsp/docs/cardiac-arrest-infographic.pdf, on Apr. 23, 2021, 2 pp.
(Continued)

*Primary Examiner* — Travis R Hunnings
(74) *Attorney, Agent, or Firm* — Shumaker & Sieffert, P.A.

(57) ABSTRACT

A system comprising processing circuitry configured to receive a wirelessly-transmitted message from a medical device, the message indicating that the medical device detected an acute health event of the patient. In response to the message, the processing circuitry is configured to determine a location of the patient, determine an alert area based on the location of the patient, and control transmission of an alert of the acute heath event of the patient to any one or more computing devices of one or more potential responders within the alert area.

18 Claims, 8 Drawing Sheets

(51) Int. Cl.
*A61B 5/103* (2006.01)
*A61B 5/145* (2006.01)
*A61B 5/321* (2021.01)
*A61N 1/372* (2006.01)
*A61N 1/39* (2006.01)

(52) U.S. Cl.
CPC ........ *A61B 5/1032* (2013.01); *A61B 5/14542* (2013.01); *A61B 5/321* (2021.01); *A61B 5/681* (2013.01); *A61B 5/6898* (2013.01); *A61B 5/746* (2013.01); *A61B 5/747* (2013.01); *A61N 1/37282* (2013.01); *A61N 1/3904* (2017.08); *A61N 1/3993* (2013.01); *A61B 2562/0219* (2013.01)

(56) References Cited

U.S. PATENT DOCUMENTS

| | | |
|---|---|---|
| 3,658,055 A | 4/1972 | Abe et al. |
| 3,677,260 A | 7/1972 | Funfstuck et al. |
| 3,828,768 A | 8/1974 | Douglas |
| 3,861,387 A | 1/1975 | Lawhorn et al. |
| 3,927,663 A | 12/1975 | Russell et al. |
| 4,023,564 A | 5/1977 | Valiquette et al. |
| 4,306,567 A | 12/1981 | Krasner |
| 4,457,315 A | 7/1984 | Bennish |
| 4,958,641 A | 9/1990 | Digby et al. |
| 5,065,766 A | 11/1991 | Sasaki |
| 5,217,021 A | 6/1993 | Steinhaus et al. |
| 5,228,449 A | 7/1993 | Christ et al. |
| 5,271,411 A | 12/1993 | Ripley et al. |
| 5,366,487 A | 11/1994 | Adams et al. |
| 5,404,877 A | 4/1995 | Nolan et al. |
| 5,416,695 A | 5/1995 | Stutman et al. |
| 5,458,123 A | 10/1995 | Unger |
| 5,944,680 A | 8/1999 | Christopherson et al. |
| 6,095,984 A | 8/2000 | Amana et al. |
| 6,129,678 A | 10/2000 | Ryan et al. |
| 6,292,687 B1 * | 9/2001 | Lowell ................... A61B 5/002 600/515 |
| 6,485,429 B2 | 11/2002 | Forstner |
| 6,487,442 B1 | 11/2002 | Wood |
| 6,490,478 B1 | 12/2002 | Zhang et al. |
| 6,493,581 B2 * | 12/2002 | Russell ................ A61N 1/3904 600/515 |
| 6,609,023 B1 | 8/2003 | Fischell et al. |
| 6,907,238 B2 | 6/2005 | Leung |
| 6,980,112 B2 | 12/2005 | Nee |
| 7,076,290 B2 | 7/2006 | Sheth et al. |
| 7,092,751 B2 | 8/2006 | Erkkili |
| 7,117,031 B2 | 10/2006 | Lohman et al. |
| 7,194,354 B1 | 3/2007 | Oran et al. |
| 7,212,849 B2 | 5/2007 | Zhang et al. |
| 7,312,709 B2 | 12/2007 | Kingston |
| 7,343,199 B2 | 3/2008 | Hatlestad et al. |
| 7,353,179 B2 | 4/2008 | Ott et al. |
| 7,396,330 B2 | 7/2008 | Banet et al. |
| 7,480,529 B2 | 1/2009 | Li |
| 7,502,498 B2 | 3/2009 | Wen et al. |
| 7,558,623 B2 | 7/2009 | Fischell et al. |
| 7,689,282 B2 | 3/2010 | Zhang et al. |
| 7,702,382 B2 | 4/2010 | Xue |
| 7,715,905 B2 | 5/2010 | Kurzweil et al. |
| 7,733,224 B2 | 6/2010 | Tran |
| 7,801,596 B2 | 9/2010 | Fischell et al. |
| 7,840,277 B2 | 11/2010 | Matos |
| 7,844,323 B2 | 11/2010 | Fischell et al. |
| 7,846,106 B2 | 12/2010 | Andrews et al. |
| 7,860,559 B2 | 12/2010 | Fischell et al. |
| 7,889,092 B2 | 2/2011 | Volk et al. |
| 7,894,883 B2 | 2/2011 | Gunderson et al. |
| 7,991,460 B2 | 8/2011 | Fischell et al. |
| 8,002,701 B2 | 8/2011 | John et al. |
| 8,073,536 B2 | 12/2011 | Gunderson et al. |
| 8,073,537 B2 | 12/2011 | Gunderson et al. |
| 8,108,036 B2 | 1/2012 | Tran |
| 8,112,153 B2 | 2/2012 | Giftakis et al. |
| 8,170,609 B2 | 5/2012 | Hedtke et al. |
| 8,170,653 B2 | 5/2012 | Fischell et al. |
| 8,204,580 B2 | 6/2012 | Kurzweil et al. |
| 8,214,043 B2 | 7/2012 | Matos |
| 8,224,430 B2 | 7/2012 | Fischell et al. |
| 8,239,020 B2 | 8/2012 | Zhang et al. |
| 8,265,740 B2 | 9/2012 | Fischell et al. |
| 8,265,751 B2 | 9/2012 | Zhang et al. |
| 8,275,457 B1 | 9/2012 | Fischell et al. |
| 8,301,236 B2 | 10/2012 | Baumann et al. |
| 8,323,189 B2 | 12/2012 | Tran et al. |
| 8,332,233 B2 | 12/2012 | Ott et al. |
| 8,352,018 B2 | 1/2013 | Xue |
| 8,369,936 B2 | 2/2013 | Farringdon et al. |
| 8,401,644 B2 | 3/2013 | Gunderson et al. |
| 8,423,128 B2 | 4/2013 | Goto |
| 8,433,399 B1 | 4/2013 | Nosrati et al. |
| 8,437,840 B2 | 5/2013 | Patel et al. |
| 8,461,988 B2 | 6/2013 | Tran |
| 8,473,065 B2 | 6/2013 | Matos |
| 8,483,807 B2 | 7/2013 | Kurzweil et al. |
| 8,512,257 B2 | 8/2013 | Fischell et al. |
| 8,521,281 B2 | 8/2013 | Patel et al. |
| 8,525,673 B2 | 9/2013 | Tran |
| 8,525,687 B2 | 9/2013 | Tran |
| 8,531,291 B2 | 9/2013 | Tran |
| 8,554,315 B2 | 10/2013 | Cho et al. |
| 8,560,069 B2 | 10/2013 | Zhang |
| 8,562,524 B2 | 10/2013 | Osorio |
| 8,565,882 B2 | 10/2013 | Matos |
| 8,583,251 B2 | 11/2013 | Matos |
| 8,630,702 B2 | 1/2014 | Fischell et al. |
| 8,680,991 B2 | 3/2014 | Tran |
| 8,682,284 B2 | 3/2014 | Brackett et al. |
| 8,684,922 B2 | 4/2014 | Tran |
| 8,706,217 B2 | 4/2014 | Bardy et al. |
| 8,706,225 B2 | 4/2014 | Matos |
| 8,712,509 B2 | 4/2014 | Lee et al. |
| 8,718,752 B2 | 5/2014 | Libbus et al. |
| 8,738,120 B2 | 5/2014 | Björling et al. |
| 8,747,336 B2 | 6/2014 | Tran |
| 8,774,908 B2 | 7/2014 | Stewart |
| 8,774,909 B2 | 7/2014 | Patel et al. |
| 8,805,529 B2 | 8/2014 | Matos |
| 8,825,146 B2 | 9/2014 | Li |
| 8,831,725 B2 | 9/2014 | Gunderson et al. |
| 8,849,400 B2 | 9/2014 | Gunderson et al. |
| 8,855,550 B2 | 10/2014 | Gaines et al. |
| 8,862,393 B2 | 10/2014 | Zhou et al. |
| 8,886,296 B2 | 11/2014 | Patel |
| 8,909,332 B2 | 12/2014 | Vitali et al. |
| 8,923,960 B2 | 12/2014 | Goto |
| 8,954,137 B2 | 2/2015 | Kurzweil et al. |
| 8,965,494 B2 | 2/2015 | Fischell et al. |
| 8,983,587 B2 | 3/2015 | Kurzweil et al. |
| 8,983,682 B1 | 3/2015 | Peeters et al. |
| 9,028,405 B2 | 5/2015 | Tran |
| 9,031,645 B2 | 5/2015 | Houben et al. |
| 9,044,148 B2 | 6/2015 | Michaelson et al. |
| 9,060,746 B2 | 6/2015 | Weng et al. |
| 9,082,156 B2 | 7/2015 | Matos |
| 9,095,727 B2 | 8/2015 | Matos |
| 9,101,278 B2 | 8/2015 | Fischell et al. |
| 9,113,830 B2 | 8/2015 | Galen et al. |
| 9,138,590 B2 | 9/2015 | Zhang et al. |
| 9,179,255 B2 | 11/2015 | Stephens et al. |
| 9,179,851 B2 | 11/2015 | Baumann et al. |
| 9,204,796 B2 | 12/2015 | Tran |
| 9,237,243 B2 | 1/2016 | Jensen et al. |
| 9,241,677 B2 | 1/2016 | Liao-Chen et al. |
| 9,254,092 B2 | 2/2016 | Albert et al. |
| 9,293,025 B2 | 3/2016 | Zhang |
| 9,307,383 B1 | 4/2016 | Patrick |
| 9,314,181 B2 | 4/2016 | Brockway et al. |
| 9,351,640 B2 | 5/2016 | Tran |
| 9,364,158 B2 | 6/2016 | Banet et al. |
| 9,445,736 B2 | 9/2016 | Kurzweil et al. |

(56) References Cited

U.S. PATENT DOCUMENTS

| | | |
|---|---|---|
| 9,456,787 B2 | 10/2016 | Venkatraman et al. |
| 9,468,383 B2 | 10/2016 | Fischell et al. |
| 9,491,277 B2 | 11/2016 | Vincent |
| 9,498,152 B2 | 11/2016 | Bowers |
| 9,642,167 B1 | 5/2017 | Snyder et al. |
| 9,662,015 B2 | 5/2017 | Proud et al. |
| 9,668,665 B2 | 6/2017 | Schroeder et al. |
| 9,681,814 B2 | 6/2017 | Galloway et al. |
| 9,724,008 B2 | 8/2017 | Sullivan et al. |
| 9,724,046 B2 | 8/2017 | Forstner |
| 9,730,604 B2 | 8/2017 | Li et al. |
| 9,735,896 B2 | 8/2017 | Flippo et al. |
| 9,770,181 B2 | 9/2017 | Kurzweil et al. |
| 9,775,520 B2 | 10/2017 | Tran |
| 9,820,667 B2 | 11/2017 | Ting et al. |
| 9,824,188 B2 | 11/2017 | Brown et al. |
| 9,826,358 B2 | 11/2017 | Ryan et al. |
| 9,852,599 B1 | 12/2017 | Slavin et al. |
| 9,855,434 B2 | 1/2018 | Matos |
| 9,901,252 B2 | 2/2018 | Tran |
| 9,913,583 B2 | 3/2018 | Smith, Sr. |
| 9,979,810 B2 | 5/2018 | Mazar et al. |
| 9,997,055 B2 | 6/2018 | Ball |
| 10,003,394 B2 | 6/2018 | Bromberg et al. |
| 10,039,469 B2 | 8/2018 | Higgins et al. |
| 10,044,857 B2 | 8/2018 | Philbin |
| 10,085,115 B2 | 9/2018 | Mayor et al. |
| 10,098,561 B2 | 10/2018 | Brockway et al. |
| 10,117,595 B2 | 11/2018 | Chang et al. |
| 10,117,606 B2 | 11/2018 | Feldman et al. |
| 10,123,741 B2 | 11/2018 | Wang et al. |
| 10,136,826 B2 | 11/2018 | Sullivan et al. |
| 10,165,400 B2 | 12/2018 | Raj |
| 10,201,710 B2 | 2/2019 | Jackson et al. |
| 10,206,593 B2 | 2/2019 | Ukil et al. |
| 10,272,010 B2 | 4/2019 | Freeman et al. |
| 10,278,050 B2 | 4/2019 | Winkler et al. |
| 10,278,607 B2 | 5/2019 | Prystowsky et al. |
| 10,307,060 B2 | 6/2019 | Tran |
| 10,362,940 B2 | 7/2019 | Tran |
| 10,368,807 B2 | 8/2019 | Melker et al. |
| 10,375,558 B2 | 8/2019 | Katz et al. |
| 10,420,529 B2 | 9/2019 | Wang et al. |
| 10,463,295 B2 | 11/2019 | Zhou |
| 10,492,686 B2 | 12/2019 | Hunter et al. |
| 10,493,290 B2 | 12/2019 | Ludwig et al. |
| 10,517,479 B2 | 12/2019 | Tran |
| 10,524,736 B2 | 1/2020 | Gross |
| 10,531,266 B2 | 1/2020 | Rauner et al. |
| 10,537,263 B2 | 1/2020 | Ibáñez Catalá |
| 10,540,878 B2 | 1/2020 | Hunter et al. |
| 10,575,748 B2 | 3/2020 | Higgins et al. |
| 10,595,731 B2 | 3/2020 | Gopalakrishnan et al. |
| 10,602,942 B2 | 3/2020 | Shakur et al. |
| 10,616,664 B2 | 4/2020 | Alman et al. |
| 10,616,747 B2 | 4/2020 | Piett et al. |
| 10,617,356 B2 | 4/2020 | Wang et al. |
| 10,624,550 B2 | 4/2020 | Soli et al. |
| 10,631,742 B2 | 4/2020 | Tal et al. |
| 10,631,744 B2 | 4/2020 | Mahajan et al. |
| 10,657,796 B2 | 5/2020 | Bowers |
| 10,674,342 B2 | 6/2020 | Park et al. |
| 10,702,213 B2 | 7/2020 | Sharma et al. |
| 10,736,532 B2 | 8/2020 | Bardy et al. |
| 10,758,140 B2 | 9/2020 | Kurzweil et al. |
| 10,796,552 B2 | 10/2020 | Fahey |
| 10,814,978 B2 | 10/2020 | Walker et al. |
| 10,882,180 B2 | 1/2021 | Wright et al. |
| 10,888,705 B2 | 1/2021 | Matos |
| 10,905,328 B2 | 2/2021 | Murphy et al. |
| 10,981,009 B2 | 4/2021 | Jackson et al. |
| 11,024,432 B2 | 6/2021 | Chiu et al. |
| 11,064,339 B2 | 7/2021 | Hamre et al. |
| 11,103,176 B2 | 8/2021 | Galloway et al. |
| 11,103,194 B2 | 8/2021 | Galloway et al. |
| 11,116,448 B1 | 9/2021 | Trapero Martin et al. |
| 11,116,989 B2 | 9/2021 | Gill et al. |
| 11,160,484 B2 | 11/2021 | Sullivan et al. |
| 11,197,629 B2 | 12/2021 | Remes et al. |
| 11,198,017 B2 | 12/2021 | Kaib et al. |
| 11,202,174 B2 | 12/2021 | Klinkner et al. |
| 11,218,584 B2 | 1/2022 | Martin et al. |
| 11,219,373 B2 | 1/2022 | Eggers et al. |
| 11,228,891 B2 | 1/2022 | King-Berkman et al. |
| 11,230,242 B2 | 1/2022 | Makled et al. |
| 11,234,604 B2 | 2/2022 | Albert |
| 11,278,201 B2 | 3/2022 | Thomson et al. |
| 11,289,197 B1 | 3/2022 | Park et al. |
| 11,291,401 B2 | 4/2022 | Velo |
| 11,311,230 B2 | 4/2022 | Sullivan et al. |
| 11,331,475 B2 | 5/2022 | Drake et al. |
| 11,341,839 B2 | 5/2022 | Cruver et al. |
| 11,344,244 B2 | 5/2022 | Albert |
| 11,363,952 B2 | 6/2022 | Venkatraman et al. |
| 11,406,314 B2 | 8/2022 | Henry et al. |
| 11,623,102 B2 | 4/2023 | Schulhauser et al. |
| 11,633,112 B2 | 4/2023 | Stadler et al. |
| 11,679,268 B2 | 6/2023 | Haddad et al. |
| 11,684,776 B2 | 6/2023 | Grubac et al. |
| 12,142,351 B2 | 11/2024 | Pinter et al. |
| 2002/0032383 A1 | 3/2002 | Weil et al. |
| 2003/0023175 A1 | 1/2003 | Arzbaecher et al. |
| 2003/0176798 A1 | 9/2003 | Simon |
| 2003/0191402 A1 | 10/2003 | Arzbaecher et al. |
| 2003/0214409 A1 | 11/2003 | Hickle |
| 2003/0233129 A1* | 12/2003 | Matos ............... A61N 1/0476 607/5 |
| 2004/0172069 A1 | 9/2004 | Hakala |
| 2004/0199212 A1 | 10/2004 | Fischell et al. |
| 2005/0065445 A1* | 3/2005 | Arzbaecher ......... A61B 5/0006 600/509 |
| 2005/0154325 A1 | 7/2005 | Lauter et al. |
| 2005/0228305 A1 | 10/2005 | Nagata et al. |
| 2005/0234313 A1 | 10/2005 | Rowlandson et al. |
| 2006/0030781 A1 | 2/2006 | Shennib |
| 2006/0155206 A1 | 7/2006 | Lynn |
| 2006/0173498 A1 | 8/2006 | Banville et al. |
| 2006/0264767 A1 | 11/2006 | Shennib |
| 2006/0284732 A1 | 12/2006 | Brock-Fisher |
| 2007/0043585 A1 | 2/2007 | Matos |
| 2007/0049976 A1 | 3/2007 | Ni et al. |
| 2007/0249944 A1 | 10/2007 | Fischell et al. |
| 2007/0260285 A1 | 11/2007 | Libbus et al. |
| 2007/0260289 A1 | 11/2007 | Giftakis et al. |
| 2007/0293775 A1 | 12/2007 | Fischell et al. |
| 2007/0299473 A1 | 12/2007 | Matos |
| 2008/0058660 A1 | 3/2008 | Fischell et al. |
| 2008/0064973 A1 | 3/2008 | Fischell et al. |
| 2008/0139954 A1 | 6/2008 | Day et al. |
| 2008/0177194 A1 | 7/2008 | Zhang et al. |
| 2008/0270036 A1 | 10/2008 | Webb |
| 2009/0054027 A1 | 2/2009 | Jenkins |
| 2009/0062670 A1 | 3/2009 | Sterling et al. |
| 2009/0076559 A1 | 3/2009 | Libbus et al. |
| 2009/0149849 A1 | 6/2009 | Lin et al. |
| 2009/0240156 A1 | 9/2009 | Fischell et al. |
| 2009/0322513 A1 | 12/2009 | Hwang et al. |
| 2009/0326595 A1 | 12/2009 | Brockway et al. |
| 2010/0016746 A1 | 1/2010 | Hampton et al. |
| 2010/0022902 A1 | 1/2010 | Lee et al. |
| 2010/0286490 A1 | 11/2010 | Koverzin et al. |
| 2011/0054934 A1 | 3/2011 | Vesto |
| 2011/0105928 A1 | 5/2011 | Bojovic et al. |
| 2011/0112417 A1 | 5/2011 | Gunderson et al. |
| 2011/0193704 A1 | 8/2011 | Harper et al. |
| 2011/0230161 A1 | 9/2011 | Newman |
| 2011/0288417 A1 | 11/2011 | Pinter et al. |
| 2012/0190969 A1 | 7/2012 | Kameli |
| 2012/0191150 A1 | 7/2012 | Kameli |
| 2012/0191151 A1 | 7/2012 | Kameli |
| 2012/0191152 A1 | 7/2012 | Kameli |
| 2012/0220835 A1 | 8/2012 | Chung |
| 2012/0242501 A1 | 9/2012 | Tran et al. |
| 2012/0306652 A1 | 12/2012 | Musol et al. |

(56) References Cited

U.S. PATENT DOCUMENTS

| | | |
|---|---|---|
| 2012/0330171 A1 | 12/2012 | Zhang et al. |
| 2013/0095459 A1 | 4/2013 | Tran |
| 2013/0211291 A1* | 8/2013 | Tran .................. G08B 25/016 600/595 |
| 2013/0245466 A1 | 9/2013 | Sachanandani et al. |
| 2014/0100497 A1 | 4/2014 | Hayashi et al. |
| 2014/0152436 A1 | 6/2014 | Langer |
| 2014/0163425 A1 | 6/2014 | Tran |
| 2014/0213202 A1 | 7/2014 | Wang et al. |
| 2014/0293053 A1 | 10/2014 | Chuang |
| 2015/0018658 A1 | 1/2015 | Fischell et al. |
| 2015/0045868 A1 | 2/2015 | Bonner et al. |
| 2015/0105632 A1 | 4/2015 | Melker et al. |
| 2015/0112605 A1 | 4/2015 | Watson et al. |
| 2015/0118658 A1* | 4/2015 | Mayou .................. A61B 5/7282 434/127 |
| 2015/0158988 A1 | 6/2015 | Sawaki et al. |
| 2015/0164375 A1 | 6/2015 | Schindhelm et al. |
| 2015/0173689 A1 | 6/2015 | Owen et al. |
| 2015/0223759 A1 | 8/2015 | Ong et al. |
| 2015/0302539 A1 | 10/2015 | Mazar et al. |
| 2015/0366518 A1 | 12/2015 | Sampson |
| 2016/0000349 A1 | 1/2016 | Sullivan et al. |
| 2016/0008614 A1 | 1/2016 | Zhang et al. |
| 2016/0035204 A1 | 2/2016 | Jansen |
| 2016/0106378 A1 | 4/2016 | Kyal et al. |
| 2016/0120434 A1 | 5/2016 | Park et al. |
| 2016/0128595 A1 | 5/2016 | Fischell et al. |
| 2016/0135706 A1 | 5/2016 | Sullivan et al. |
| 2016/0151021 A1 | 6/2016 | Feng et al. |
| 2016/0174857 A1 | 6/2016 | Eggers et al. |
| 2016/0174875 A1 | 6/2016 | Forster et al. |
| 2016/0325107 A1 | 11/2016 | Park et al. |
| 2016/0328950 A1 | 11/2016 | Pelletier et al. |
| 2016/0331330 A1 | 11/2016 | Freeman et al. |
| 2016/0354011 A1 | 12/2016 | Stahl |
| 2017/0007167 A1 | 1/2017 | Kostic et al. |
| 2017/0083667 A1 | 3/2017 | Darrah et al. |
| 2017/0099579 A1* | 4/2017 | Ryan .................. H04M 3/5116 |
| 2017/0246329 A1 | 8/2017 | Lloyd |
| 2017/0281097 A1 | 10/2017 | Thakur et al. |
| 2017/0296076 A1 | 10/2017 | Mahajan et al. |
| 2017/0323485 A1 | 11/2017 | Samec et al. |
| 2017/0330438 A1 | 11/2017 | Howard et al. |
| 2017/0354365 A1 | 12/2017 | Zhou |
| 2017/0360361 A1 | 12/2017 | Long et al. |
| 2017/0366921 A1 | 12/2017 | Pflugh et al. |
| 2018/0008159 A1 | 1/2018 | Wang et al. |
| 2018/0091657 A1 | 3/2018 | Brown et al. |
| 2018/0113986 A1 | 4/2018 | Zhu |
| 2018/0113987 A1 | 4/2018 | Zhu |
| 2018/0116537 A1 | 5/2018 | Sullivan et al. |
| 2018/0117299 A1 | 5/2018 | Gustavson et al. |
| 2018/0146922 A1 | 5/2018 | Wang et al. |
| 2018/0192894 A1 | 7/2018 | An et al. |
| 2018/0220897 A1 | 8/2018 | Meger et al. |
| 2018/0221645 A1* | 8/2018 | Medema .............. A61N 1/0484 |
| 2018/0235537 A1 | 8/2018 | Whiting et al. |
| 2018/0243578 A1 | 8/2018 | Volosin |
| 2018/0260706 A1 | 9/2018 | Galloway et al. |
| 2018/0301017 A1 | 10/2018 | Dizengof et al. |
| 2018/0322405 A1 | 11/2018 | Fadell et al. |
| 2018/0338731 A1 | 11/2018 | Addison et al. |
| 2018/0348759 A1 | 12/2018 | Freeman et al. |
| 2019/0043616 A1 | 2/2019 | Howard et al. |
| 2019/0066538 A1 | 2/2019 | Chao et al. |
| 2019/0083804 A1 | 3/2019 | Grinberg et al. |
| 2019/0125273 A1 | 5/2019 | Sharma et al. |
| 2019/0197861 A1 | 6/2019 | Tunnell et al. |
| 2019/0275225 A1 | 9/2019 | Brown |
| 2019/0279480 A1 | 9/2019 | Lee et al. |
| 2019/0290216 A1 | 9/2019 | Koyama |
| 2019/0298201 A1 | 10/2019 | Persen et al. |
| 2019/0307328 A1 | 10/2019 | Tran |
| 2019/0328251 A1 | 10/2019 | Jin |
| 2019/0336767 A1 | 11/2019 | Klepfer et al. |
| 2019/0365264 A1 | 12/2019 | Freeman et al. |
| 2019/0365269 A1 | 12/2019 | Jun |
| 2019/0391581 A1 | 12/2019 | Vardaro et al. |
| 2020/0008696 A1 | 1/2020 | Sirendi et al. |
| 2020/0038671 A1 | 2/2020 | Schulhauser et al. |
| 2020/0046241 A1 | 2/2020 | Lam et al. |
| 2020/0069245 A1 | 3/2020 | Zhou |
| 2020/0077892 A1 | 3/2020 | Tran |
| 2020/0085380 A1 | 3/2020 | Sampson |
| 2020/0100693 A1 | 4/2020 | Velo |
| 2020/0113459 A1 | 4/2020 | Jäntti et al. |
| 2020/0146550 A1 | 5/2020 | Tunnell et al. |
| 2020/0160991 A1 | 5/2020 | Smith et al. |
| 2020/0178821 A1 | 6/2020 | Wu et al. |
| 2020/0305737 A1 | 10/2020 | Tseng et al. |
| 2020/0337567 A1 | 10/2020 | McCalmont et al. |
| 2020/0337581 A1 | 10/2020 | Jung et al. |
| 2020/0342966 A1 | 10/2020 | Stern et al. |
| 2020/0352462 A1 | 11/2020 | Pedalty et al. |
| 2020/0352466 A1 | 11/2020 | Chakravarthy et al. |
| 2020/0352522 A1 | 11/2020 | Chakravarthy et al. |
| 2020/0357519 A1 | 11/2020 | Chakravarthy et al. |
| 2020/0373005 A1 | 11/2020 | Halsne et al. |
| 2020/0380840 A1 | 12/2020 | Galarneau et al. |
| 2020/0390354 A1 | 12/2020 | Huegerich et al. |
| 2020/0397308 A1 | 12/2020 | Sarkar et al. |
| 2021/0118562 A1 | 4/2021 | Matos |
| 2021/0121090 A1 | 4/2021 | Weinstein et al. |
| 2021/0138243 A1 | 5/2021 | Zhang et al. |
| 2021/0138254 A1 | 5/2021 | Matos |
| 2021/0154487 A1* | 5/2021 | Bongberg .............. G16H 80/00 |
| 2021/0169392 A1 | 6/2021 | Albert et al. |
| 2021/0186329 A1 | 6/2021 | Tran |
| 2021/0251578 A1 | 8/2021 | Schulhauser et al. |
| 2021/0259560 A1 | 8/2021 | Venkatraman et al. |
| 2021/0314756 A1 | 10/2021 | Brooks et al. |
| 2021/0338134 A1 | 11/2021 | Chakravarthy et al. |
| 2021/0338138 A1 | 11/2021 | Pedalty et al. |
| 2021/0343132 A1 | 11/2021 | Bonser |
| 2021/0343416 A1 | 11/2021 | Chakravarthy et al. |
| 2021/0345934 A1 | 11/2021 | Landgraf et al. |
| 2021/0353166 A1 | 11/2021 | Sirendi et al. |
| 2021/0401349 A1 | 12/2021 | Schram |
| 2022/0023626 A1 | 1/2022 | Haddad et al. |
| 2022/0031253 A1 | 2/2022 | Burnes et al. |
| 2022/0039729 A1 | 2/2022 | Fontanarava et al. |
| 2022/0051548 A1 | 2/2022 | Pellegrini et al. |
| 2022/0061678 A1 | 3/2022 | Schulhauser et al. |
| 2022/0095982 A1 | 3/2022 | de Saint Victor et al. |
| 2022/0151533 A1 | 5/2022 | Moon |
| 2022/0160250 A1 | 5/2022 | Anderson et al. |
| 2022/0183607 A1 | 6/2022 | Volosin et al. |
| 2022/0218259 A1 | 7/2022 | Laversin et al. |
| 2022/0249026 A1 | 8/2022 | Heneghan et al. |
| 2022/0280047 A1* | 9/2022 | Stadler .................. A61N 1/3993 |
| 2022/0346725 A1 | 11/2022 | Krause et al. |
| 2022/0369937 A1 | 11/2022 | Cho et al. |
| 2023/0263406 A1 | 8/2023 | Stadler et al. |

FOREIGN PATENT DOCUMENTS

| | | |
|---|---|---|
| CN | 105769171 A | 7/2016 |
| CN | 106264518 A | 1/2017 |
| CN | 106562777 A | 4/2017 |
| CN | 107874753 A | 4/2018 |
| CN | 108039203 A | 5/2018 |
| CN | 108324264 A | 7/2018 |
| CN | 207924885 U | 9/2018 |
| CN | 109009047 A | 12/2018 |
| CN | 208460154 U | 2/2019 |
| CN | 109820492 A | 5/2019 |
| CN | 109953753 A | 7/2019 |
| CN | 111667921 A | 9/2020 |
| CN | 112022145 A | 12/2020 |
| CN | 112515650 A | 3/2021 |
| CN | 112515651 A | 3/2021 |
| CN | 113080917 A | 7/2021 |
| CN | 113598784 A | 11/2021 |

(56) References Cited

FOREIGN PATENT DOCUMENTS

| | | |
|---|---|---|
| CN | 215128553 U | 12/2021 |
| CN | 114711781 A | 7/2022 |
| CN | 217014071 U | 7/2022 |
| EP | 2689363 A2 | 1/2014 |
| ES | 2559263 T3 | 2/2016 |
| FI | 128143 B | 12/2018 |
| GB | 2569157 A | 6/2019 |
| GB | 2590556 B | 6/2021 |
| GB | 2600710 A | 5/2022 |
| IN | 201811048444 A | 12/2018 |
| JP | 3031277 B2 | 4/2000 |
| JP | 2007289694 A | 11/2007 |
| JP | 2009089883 A | 4/2009 |
| JP | 6764830 A | 12/2018 |
| JP | 2019129954 A | 8/2019 |
| KR | 20030008655 A | 1/2003 |
| KR | 100400212 B1 | 11/2003 |
| KR | 100637566 B1 | 10/2006 |
| KR | 101756787 B1 | 7/2017 |
| KR | 102195189 B1 | 12/2020 |
| MX | 2016007079 A | 11/2017 |
| SU | 442789 A1 | 9/1974 |
| SU | 1042732 A1 | 9/1983 |
| TR | 201719097 A2 | 6/2019 |
| TW | M555707 U | 2/2018 |
| TW | I669097 B | 8/2019 |
| WO | 2005021089 A1 | 3/2005 |
| WO | 2009001361 A2 | 12/2008 |
| WO | 2010105053 A3 | 1/2011 |
| WO | 2012135059 A2 | 10/2012 |
| WO | 2016034203 A1 | 3/2016 |
| WO | 2017059274 A1 | 4/2017 |
| WO | 2018202606 A1 | 11/2018 |
| WO | 2019096876 A1 | 5/2019 |
| WO | 2019110963 A1 | 6/2019 |
| WO | 2020115747 A1 | 6/2020 |
| WO | 2020155078 A1 | 8/2020 |
| WO | 2020226879 | 11/2020 |
| WO | 2020226881 | 11/2020 |
| WO | 2020226887 | 11/2020 |
| WO | 2021084535 | 5/2021 |
| WO | 2021133360 A1 | 7/2021 |
| WO | 2021181389 A1 | 9/2021 |
| WO | 2022034045 | 2/2022 |
| WO | 2022034480 | 2/2022 |
| WO | 2022070109 | 4/2022 |
| WO | 2022130152 | 6/2022 |

OTHER PUBLICATIONS

"Heart Disease and Stroke Statistics—2019 Update A Report From the American Heart Association," Circulation, vol. 139, Mar. 5, 2019 pp. e56-e528.
"Highlights of the 2020 American Heart Association Guidelines for CPR and ECC," American Heart Association, 2020 (Applicant points out, in accordance with MPEP 609.04(a), that the year of publication, 2020, is sufficiently earlier than the effective U.S. filing date, so that the particular month of publication is not in issue.) 32 p.
"Monitor your heart rate with Apple Watch," retrieved from https://support.apple.com/en-us/HT204666, on Apr. 23, 2021, 8 pp.
"Protocol 9, Cardiac or Respiratory Arrest," The EMD Protocol, National Academy Medical Prioity Dispatch System, Accessed on Apr. 23, 2021, 5 pp.
"Using Apple Watch for Arrhythmia Detection," Apple, Inc., Dec. 2020, 17 pp.
Auer et al., "A Smartwatch to Identify Atrial Fibrillation," The New England Journal of Medicine, vol. 382, No. 10, Mar. 5, 2020, pp. 974-976.
Bayanbay et al., "The Use of Unmanned Aerial Vehicle for Emergency Medical Assistance", 20th International Conference of Young Specialists on Micro/Nanotechnologies and Electron Devices, IEEE, Jun. 29, 2019, pp. 597-600.
Beauchamp et al., "The Use of Wearables in Clinical Trials During Cancer Treatment: Systematic Review," JMIR Mhealth Uhealth, vol. 8, No. 11, e22006, Nov. 2020, 15 pp.
Blomberg et al., "Effect of Machine Learning on Dispatcher Recognition of Out-of-Hospital Cardiac Arrest During Calls to Emergency Medical Services a Randomized Clinical Trial," JAMA Network Open, Jan. 6, 2021, 10 pp.
Book of Abstracts, Acta Cardiologica, vol. 76, supp 1, Feb. 22, 2021, 52 pp.
Bumgarner et al., "Smartwatch Algorithm for Automated Detection of Atrial Fibrillation," Journal of the American College of Cardiology, vol. 71, No. 21, May 29, 2018, pp. 2381-2388.
Burke et al., "Smartwatch Detection of Ventricular Tachycardia: Case Series," Heart Rhythm Case Reports, vol. 6, No. 10, Oct. 2020, pp. 801-804.
Campion et al., "Watched by Apple," The New England Journal of Medicine, vol. 381, No. 20, Nov. 14, 2019, pp. 1964-1965.
Cares Annual Report 2019, 2019 (Applicant points out, in accordance with MPEP 609.04(a), that the year of publication, 2019, is sufficiently earlier than the effective U.S. filing date, so that the particular month of publication is not in issue.) 48 pp.
Carpenter et al., "Smart-Watches: a Potential Challenger to the Implantable Loop Recorder?," Europace, vol. 18, Feb. 2016, pp. 791-793.
Centers for Disease Control and Prevention et al., "What is v-safe?", Jun. 10, 2022, 1 pp., URL: https://www.cdc.gov/coronavirus/2019-ncov/vaccines/safety/pdfs/v-safe-information-sheet-508c.pdf.
Chan et al., "Contactless Cardiac Arrest Detection Using Smart Devices," NPJ Digital Medicine, vol. 2, No. 52, Jun. 19, 2019, 8 pp.
Dayananda et al., "An Interconnected Architecture for an Emergency Medical Response Unmanned Aerial System," 2017 IEEE/AIAA 36th Digital Avionics Systems Conference (DASC), Sep. 17-21, 2017, pp. 1-6.
Deo et al., "Epidemiology and Genetics of Sudden Cardiac Death," Circulation, vol. 125, No. 4, Jan. 31, 2012, pp. 620-637.
Giancaterino et al., "The Smartwatch Will See You Now: Implications of Mass Screening for Atrial Fibrillation," Journal of the American College of Cardiology, vol. 72, No. 12, Sep. 18, 2018, pp. 1433-1434.
Goldberger et al., "Risk Stratification for Sudden Cardiac Death a Plan for the Future," Circulation, vol. 129, No. 4, Jan. 28, 2014, pp. 516-526.
Hause et al., "COVID-19 Vaccine Safety in Adolescents Aged 12-17 Years—United States, Dec. 14, 2020-Jul. 16, 2021", Centers for Disease Control and Prevention, Jul. 30, 2021, 9 pp., URL: https://www.cdc.gov/mmwr/volumes/70/wr/mm7031e1.htm.
Hirano et al., "Early Outcome Prediction for Out-of-Hospital Cardiac Arrest with Initial Shockable Rhythm Using Machine Learning Models," Resuscitation, vol. 158, No. 145, Jan. 2021, pp. 49-56.
Hwang et al., "Assessing Accuracy of Wrist-Worn Wearable Devices in Measurement of Paroxysmal Supraventricular Tachycardia Heart Rate," Korean Circulation Journal, vol. 49, No. 5, May 2019, pp. 437-445.
Instructions for Irregular Rhythm Notification, Apple Inc., Jun. 2020, 154 pp.
International Search Report and Written Opinion of International Application No. PCT/US2022/016502, dated May 5, 2022, 10 pp.
Koshy et al., "Smart Watches for Heart Rate Assessment in Atrial Arrhythmias," International Journal of Cardiology, vol. 266, Sep. 1, 2018, pp. 124-127.
Li et al., "The Current State of Mobile Phone Apps for Monitoring Heart Rate, Heart Rate Variability, and Atrial Fibrillation: Narrative Review," JMIR Mhealth Uhealth, vol. 7, No. 2, e11606, Feb. 15, 2019, 16 pp.
Medtronic Linq II, Medtronic CareLink Network, Jan. 29, 2021, 11 pp.
Mell et al., "Emergency Medical Services Response Times in Rural, Suburban, and Urban Areas," JAMA Surgery, vol. 152, No. 10, Oct. 2017, pp. 983-984.
Okubo et al., "Characteristics of Paediatric Out-of-Hospital Cardiac Arrest in the United States," Resuscitation, vol. 153, Apr. 27, 2020, pp. 227-233.

(56) References Cited

OTHER PUBLICATIONS

Papini et al., "Wearable Monitoring of Sleep-Disordered Breathing: Estimation of the Apnea-Hypopnea Index Using Wrist-Worn Reflective Photoplethysmography," Scientific Reports, vol. 10, No. 13512, Aug. 11, 2020, 15 pp.
Perez et al., "Large-Scale Assessment of a Smartwatch to Identify Atrial Fibrillation," The New England Journal of Medicine, vol. 381, No. 20, Nov. 14, 2019, pp. 1909-1917.
Pulsepoint, "Activate Citizen Response.", Building informed communities, 14 pp., Retrieved from the Internet on Oct. 25, 2021 from URL: ttps://www.pulsepoint.org.
Ringwald et al., "Smart Watch Recording of Ventricular Tachycardia: Case Study," American Journal of Emergency Medicine, vol. 38, No. 4, Apr. 1, 2020, pp. 849.e3-849.e5.
Roberts et al., "Best Buy makes deal to provide its senior services on Apple Watch", Star Tribune, Mar. 3, 2021, 2 pp., URL: https://www.startribune.com/best-buy-makes-deal-to-provide-its-senior-services-on-apple-watch/600029754/.
Rudner et al., "Interrogation of Patient Smartphone Activity Tracker to Assist Arrhythmia Management," Annals of Emergency Medicine, vol. 68, No. 3, Sep. 2016, pp. 292-294.
Salcido et al., "Have Outcomes After Out of Hospital Cardiac Arrest Improved Over Time?," Circulation: Cardiovascular Quality and Outcomes, vol. 14, No. 3, e007752, Mar. 2021, pp. 290-291.
Samani et al., "Robotic Automated External Defibrillator Ambulance for Emergency Medical Service in Smart Cities", vol. 4, IEEE, Jan. 4, 2016, pp. 268-283.
Samsung Galaxy Watch3 LTE Smartwatch, retrieved from https://www.samsung.com/us/watches/galaxywatch3/# health, on Apr. 29, 2021, 31 pp.
Seifert, "Say hello to Astro, Alexa on wheels", The Verge, Sep. 28, 2021, 18 pp., URL: https://www.theverge.com/2021/9/28/22697244/amazon-astro-home-robot-hands-on-features-price.
Seshadri et al., "Accuracy of Apple Watch for Detection of Atrial Fibrillation," Circulation, vol. 141, No. 8, Feb. 25, 2020, pp. 702-703.
Shcherbina et al., "Accuracy in Wrist-Worn, Sensor-Based Measurements of Heart Rate and Energy Expenditure in a Diverse Cohort," Journal of Personalized Medicine, vol. 3, No. 7, May 24, 2017, 12 pp.
Singh, "Detecting Atrial Fibrillation with with the Apple Watch: Our Clinically Validated Results," https://blog.cardiogr.am/detecting-atrial-fibrillation-with-the-apple-watch-our-clinically-validated-resultsea66163e0fa6, Mar. 21, 2018, 14 pp.
Singhal et al., "The Role of Wearables in Heart Failure," Current Heart Failure Reports, vol. 17, No. 4, Jun. 3, 2020, pp. 125-132.
Solomon et al., "Sudden Death in Patients with Myocardial Infarction and Left Ventricular Dysfunction, Heart Failure, or Both," vol. 352, No. 25, Jun. 23, 2005, pp. 2581-2588.
Sudden Cardiac Arrest Meeting the Challenge, The Joint Commission, 2011 (Applicant points out, in accordance with MPEP 609.04(a), that the year of publication, 2011, is sufficiently earlier than the effective U.S. filing date, so that the particular month of publication is not in issue.) 87 pp.
Tarakji et al., "Using a Novel Wireless System for Monitoring Patients After the Atrial Fibrillation Ablation Procedure: The iTransmit Study," Heart Rhythm Journal, vol. 12, No. 3, Mar. 1, 2015, pp. 554-559.
Than et al., "Machine Learning to Predict the Likelihood of Acute Myocardial Infarction," Circulation, vol. 140, Sep. 10, 2019, pp. 899-909.
Tuohy, "Amazon is now accepting your applications for its home surveillance drone", The Verge, Sep. 29, 2021, 9 pp., URL: https://www.theverge.com/2021/9/28/22692048/ring-always-home-cam-drone-amazon-price-release-date-specs.
Turakhia et al., "Rationale and Design of a Large-Scale, App-Based Study to Identify Cardiac Arrhythmias Using a Smartwatch: the Apple Heart Study," American Heart Journal, vol. 207, Jan. 2019, pp. 66-75.
U.S. Appl. No. 16/593,739, filed Oct. 4, 2019, by Haddad et al.
U.S. Appl. No. 17/006,444, filed Aug. 28, 2020, by Schulhauser.
U.S. Appl. No. 17/101,945, filed Nov. 23, 2020, by Anderson et al.
U.S. Appl. No. 17/301,923, filed Apr. 19, 2021, by Anderson et al.
U.S. Appl. No. 17/383,170, filed Jul. 22, 2021, naming inventors Haddad et al.
U.S. Appl. No. 17/459,713, filed Aug. 27, 2021, naming inventors Schulhauser et al.
U.S. Appl. No. 18/549,227, filed Feb. 17, 2022, naming inventors Ousdigian et al.
U.S. Appl. No. 18/549,400, filed Feb. 10, 2022, naming inventors Krause et al.
U.S. Appl. No. 18/551,322, filed Feb. 17, naming inventors Neitzell et al.
U.S. Appl. No. 18/552,324, filed Feb. 17, 2022, naming inventors Sarkar et al.
U.S. Appl. No. 63/071,997, filed Aug. 28, 2020, naming inventors Schulhauser et al.
U.S. Appl. No. 63/219,595, filed Jul. 8, 2021, naming inventors Gunderson et al.
U.S. Appl. No. 63/362,451, filed Apr. 4, 2022, naming inventors Galarneau et al.
Volosin et al., "Tachycardia detection performance of implantable loop recorders: results from a large 'real-life' patient cohort and patients with induced ventricular arrhythmias", Europace, vol. 15, No. 8, European Society of Cardiology, Aug. 1, 2013, pp. 1215-1222, URL: https://academic.oup.com/europace/article/15/8/1215/2398708.
Waldmann et al., "Temporal Trends of Out-of-Hospital Cardiac Arrests Without Resuscitation Attempt by Emergency Medical Services," Circulation: Cardiovascular Quality and Outcomes, vol. 14, No. e006626, Mar. 2021, pp. 279-289.
Wang et al., "Accuracy of Wrist-Worn Heart Rate Monitors," JAMA Cardiology, vol. 2, No. 1, Jan. 2017, pp. 104-106.
Wikipedia, "PulsePoint", Oct. 1, 2021, 12 pp., URL: https://en.wikipedia.org/wiki/PulsePoint.
Zaman et al., "Sudden Cardiac Death Early After Myocardial Infarction Pathogenesis, Risk Stratification, and Primary Prevention," Circulation, vol. 129, No. 23, Jun. 10, 2014, pp. 2426-2435.

* cited by examiner

ACUTE HEALTH EVENT MONITORING
AND ALERTING

This application is a U.S. National Stage entry under 35 U.S.C. § 371 of International Application No. PCT/US2022/016502, filed Feb. 16, 2022, which claims priority from and the benefit of U.S. Provisional Patent Application Ser. No. 63/158,189, filed on Mar. 8, 2021, the entire content of each of which is incorporated herein by reference.

FIELD

This disclosure generally relates to systems including medical devices and, more particularly, to monitoring of patient health using such systems.

BACKGROUND

A variety of devices are configured to configured to monitor physiological signals of a patient. Such devices include implantable or wearable medical devices, as well as a variety of wearable health or fitness tracking devices. The physiological signals sensed by such devices include as examples, electrocardiogram (ECG) signals, respiration signals, perfusion signals, activity and/or posture signals, pressure signals, blood oxygen saturation signals, body composition, and blood glucose or other blood constituent signals. In general, using these signals, such devices facilitate monitoring and evaluating patient health over a number of months or years, outside of a clinic setting.

In some cases, such devices are configured to detect acute health events based on the physiological signals, such as episodes of cardiac arrhythmia, myocardial infarction, stroke, or seizure. Example arrhythmia types include cardiac arrest (e.g., asystole), ventricular tachycardia (VT), and ventricular fibrillation (VF). The devices may store ECG and other physiological signal data collected during a time period including an episode as episode data. Such acute health events are associated with significant rates of death, particularly if not treated quickly.

For example, VF and other malignant tachyarrhythmias are the most commonly identified arrhythmia in sudden cardiac arrest (SCA) patients. If this arrhythmia continues for more than a few seconds, it may result in cardiogenic shock and cessation of effective blood circulation. The survival rate from SCA decreases between 7 and 10 percent for every minute that the patient waits for defibrillation. Consequently, sudden cardiac death (SCD) may result in a matter of minutes.

SUMMARY

In general, the disclosure describes techniques for providing alerts in response to detection of an acute health event of a patient by a medical device. In some examples, a computing device of the patient, such as a smartphone or smartwatch, receives a wirelessly-transmitted message indicating detection of the acute health event from the medical device, e.g., an implantable medical device. Processing circuitry, e.g., of the computing device, may perform a variety of actions in response to the message, such as analyzing physiological data of the patient to confirm the acute health event, presenting a local alert via a user interface of the computing device, and determining whether the alert is canceled within a time interval, calling an emergency medical service (e.g., 911), and transmitting an alert to family and/or caregivers of the patient. The processing circuitry may also control transmission of an alert to any one or more computing devices of one or more potential responders who happen to be within an alert area determined based on a location of the patient. The techniques described herein may reduce the time-to-treatment of the acute health event.

In one example, a system comprises processing circuitry configured to receive a wirelessly-transmitted message from a medical device, the message indicating that the medical device detected an acute health event of the patient. In response to the message, the processing circuitry is configured to determine a location of the patient, determine an alert area based on the location of the patient, and control transmission of an alert of the acute heath event of the patient to any one or more computing devices of one or more potential responders within the alert area.

In another example, a method comprises, by processing circuitry: receiving a wirelessly-transmitted message from a medical device, the message indicating that the medical device detected an acute health event of the patient; and in response to the message: determining a location of the patient; determining an alert area based on the location of the patient; and controlling transmission of an alert of the acute heath event of the patient to any one or more computing devices of one or more potential responders within the alert area.

In another example, a system comprises processing circuitry configured to perform any of the methods described herein.

In another example, a non-transitory computer readable storage medium comprises program instructions configured to cause processing circuitry to perform any of the methods described herein.

This summary is intended to provide an overview of the subject matter described in this disclosure. It is not intended to provide an exclusive or exhaustive explanation of the apparatus and methods described in detail within the accompanying drawings and description below. Further details of one or more examples are set forth in the accompanying drawings and the description below.

BRIEF DESCRIPTION OF DRAWINGS

Like reference characters refer to like elements throughout the figures and description.

DETAILED DESCRIPTION

A variety of types of implantable and medical devices detect arrhythmia episodes and other acute health events based on sensed ECGs and, in some cases, other physiological signals. External devices that may be used to non-invasively sense and monitor ECGs and other physiological signals include wearable devices with electrodes configured to contact the skin of the patient, such as patches, watches, or necklaces. Such external devices may facilitate relatively longer-term monitoring of patient health during normal daily activities.

Implantable medical devices (IMDs) also sense and monitor ECGs and other physiological signals, and detect acute health events such as episodes of arrhythmia, cardiac arrest, myocardial infarction, stroke, and seizure. Example IMDs include pacemakers and implantable cardioverter-defibrillators, which may be coupled to intravascular or extravascular leads, as well as pacemakers with housings configured for implantation within the heart, which may be leadless. Some IMDs do not provide therapy, such as implantable patient monitors. One example of such an IMD is the Reveal LINQ™ Insertable Cardiac Monitor (ICM), available from Medtronic plc, which may be inserted subcutaneously. Such IMDs may facilitate relatively longer-term monitoring of patients during normal daily activities, and may periodically transmit collected data, e.g., episode data for detected arrhythmia episodes, to a remote patient monitoring system, such as the Medtronic Carelink™ Network.

Figure 1A:
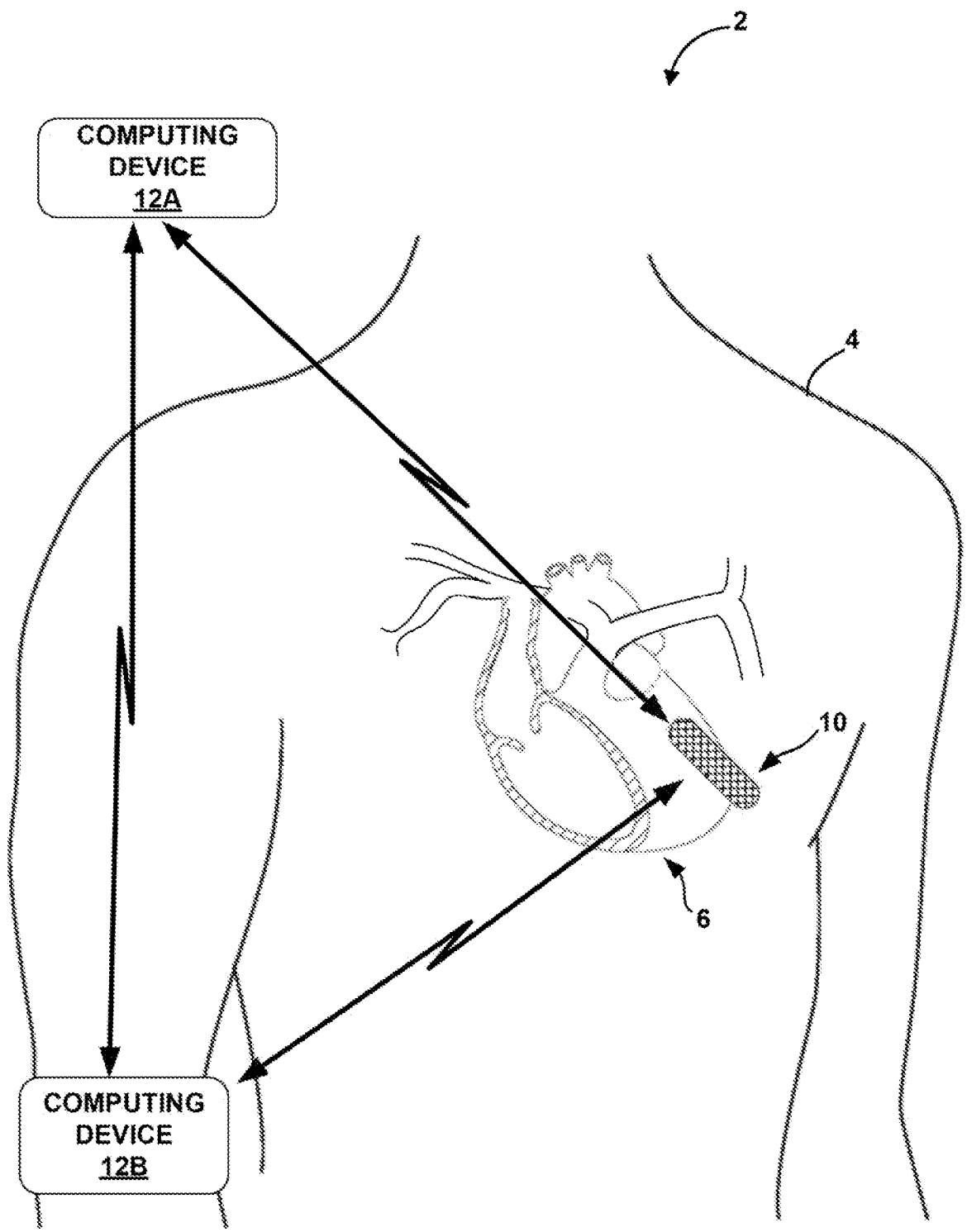
FIGS. 1A and 1B are block diagrams illustrating an example medical device system configured to detect acute health events, and to respond to such detections, in accordance with one or more techniques of this disclosure.
Figure 1B:
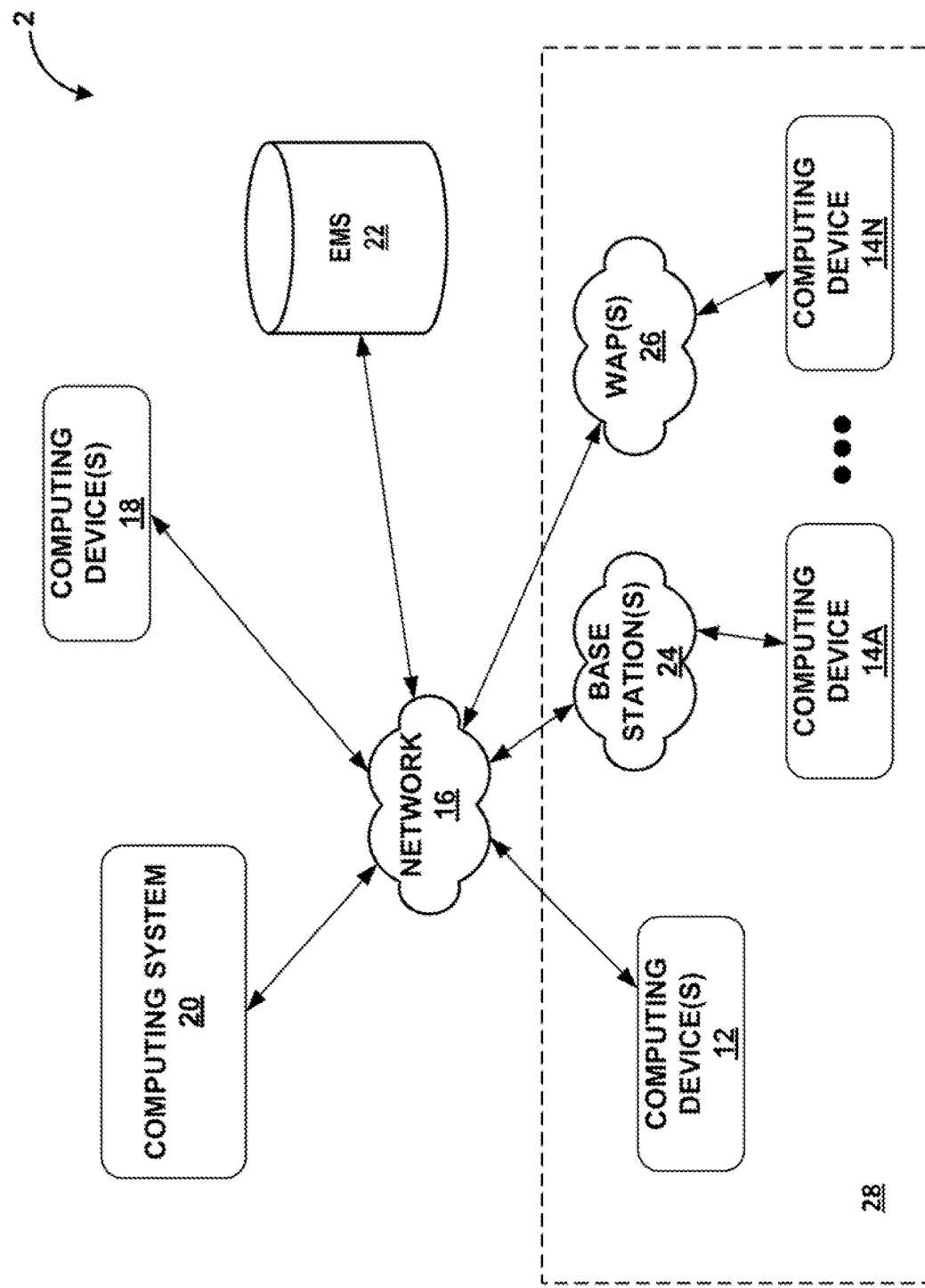

FIGS. 1A and 1B are block diagrams illustrating an example medical device system 2 configured to detect and respond to acute health events of a patient 4, in accordance with the techniques of the disclosure. The example techniques may be used with an IMD 10, which may be in wireless communication with one or more external computing devices, e.g., computing devices 12A and 12B (collectively "computing devices 12"). In some examples, IMB 10 is implanted outside of a thoracic cavity of patient 4 (e.g., subcutaneously in the pectoral location illustrated in FIG. 1). IMD 10 may be positioned near the sternum near or just below the level of the heart of patient 4, e.g., at least partially within the cardiac silhouette. 1 MB 10 includes a plurality of electrodes (not shown in FIG. 1), and is configured to sense an ECG via the plurality of electrodes. In some examples, IMD 10 takes the form of the LINQ™ ICM. Although described primarily in the context of examples in which the IMD takes the form of an ICM, the techniques of this disclosure may be implemented in systems including any one or more implantable or external medical devices, including monitors, pacemakers, defibrillators, or neurostimulators.

Computing devices 12 are configured for wireless communication with IMD 10. Computing devices 12 retrieve episode and other physiological data from IMD 10 that was collected and stored by IMD 10. In some examples, computing devices 12 take the form of personal computing devices of patient 4. For example, computing device 12A may take the form of a smartphone of patient 4, and computing device 12B may take the form of a smartwatch or other smart apparel of patient 4. In some examples, computing device(s) 12 may be any computing device configured for wireless communication with IMD 10, such as a desktop, laptop, or tablet computer, a smart home controller, alarm, thermostat, speaker, or other smart appliance, or any Internet of Things (IoT) device. Computing devices 12 may communicate with IMD 10 and each other according to the Bluetooth® or Bluetooth® Low Energy (BLE) protocols, as examples. In some examples, only one of computing devices 12, e.g., computing device 12A, is configured for communication with IMD 10, e.g., due to execution of software enabling communication and interaction with IMD 10.

In some examples, computing device(s) 12, e.g., wearable computing device 12B in the example illustrated by FIG. 1A, may include electrodes and other sensors to sense physiological signals of patient 4, and may collect and store physiological data and detect episodes based on such signals. Computing device 12B may be incorporated into the apparel of patient 14, such as within clothing, shoes, eyeglasses, a watch or wristband, a hat, etc. In some examples, computing device 12B is a smartwatch or other accessory or peripheral for a smartphone computing device 12A.

One or more of computing devices 12 may be configured to communicate with a variety of other devices or systems, such as computing system 20, via a network 16. Computing device(s) 12 may transmit data, including data retrieved from IMD 10, to computing system 20 via network 16. The data may include values of physiological parameters measured by IMD 10 and, in some cases one or more of computing devices 12, data regarding episodes of arrhythmia or other health events detected by IMD 10 and computing device(s) 12, and other physiological signals or data recorded by IMD 10 and/or computing device(s) 12.

Computing system 20 may comprise computing devices configured to allow users, e.g., clinicians treating patient 4 and other patients, to interact with data collected from IMDs 10 and computing devices 12 of their patients. In some examples, computing system 20 includes one or more hand-held computing devices, computer workstations, servers, or other networked computing devices. Computing system 20 may comprise, or may be implemented by, the Medtronic Carelink™ Network, in some examples.

Network 16 may include one or more computing devices (not shown), such as one or more non-edge switches, routers, hubs, gateways, security devices such as firewalls, intrusion detection, and/or intrusion prevention devices, servers, cellular base stations and nodes, wireless access points, bridges, cable modems, application accelerators, or other network devices. Network 16 may include one or more networks administered by service providers, and may thus form part of a large-scale public network infrastructure, e.g., the Internet. Network 16 may provide computing devices, such as computing devices 12, computing devices 14A-14N (collectively, "computing devices 14"), computing device(s) 18, computing system 20, and emergency medical system (EMS) 22 access to the Internet, and may provide a communication framework that allows the computing devices to communicate with one another. In some examples, network 16 may include a private network that provides a communication framework that allows external device(s) 12 to communicate with computing system 20 and/or other systems or devices, but isolates one or more of these devices or data flows between these device from devices external to the private network for security purposes. In some examples, the communications between external device(s) 12 and other devices, such as devices of computing system 20, are encrypted.

Processing circuitry of system 2, e.g., processing circuitry of one or more of computing device 12A, computing device 12B, and computing system 20, alone or in any combination, may implement the techniques of this disclosure for responding to detection of an acute health event of patient 4 by IMD 10. The processing circuitry may receive a wirelessly-transmitted message from IMD 10. The message may indicate that the medical device detected an acute health event of the patient. The message may indicate a time that IMD 10 detected the acute health event. The message may include physiological data collected by IMD 10, e.g., data which lead to detection of the acute health event, data prior to detection of the acute health event, and/or real-time or more recent data collected after detection of the acute health event. The physiological data may include values of one or more physiological parameters and/or digitized physiological signals. Examples of acute health events are a cardiac arrest, a ventricular fibrillation, a ventricular tachycardia, a stroke, a seizure, or a fall.

The processing circuitry may provide alerts in response to the detection of the acute health event. For example, the processing circuitry may determine a location of patient 4, and determine an alert area 28 based on the location of the patient. Computing devices 14A-14N (collectively, "computing devices 14") are computing devices of one or more potential responders that may be able to provide aid to the patient with the acute health event by virtue being within alert area 28 and, thus, sufficiently proximate to the location of patient 4. The potential responders are not necessarily known in advance to be potential responders or caregivers either for patient 4 or the acute health event experienced by patient 4. The processing circuitry may transmit an alert to any computing devices 14 that are within alert area 28, which may present the alert to the user responders.

In some examples, to determine the alert area, the processing circuitry is configured to identify, based on the location of patient 4, at least one of: one or more cellular base stations 24 or one or more wireless access points (WAPs) 26 that are within (or whose coverage areas are within) a threshold distance of the location of patient 4. The processing circuitry may be configured to control transmission of the alert to any one or more computing devices 14 in communication with the one or more cellular base stations or wireless access points.

In some examples, to determine the alert area, the processing circuitry is configured to determine a geofence based on the location of patient 4 and a predetermined distance from patient 4. The processing may be configured to control transmission of the alert to any one or more computing devices 14 within the geofence. This technique for sending alerts to computing devices 14 within alert area 28 may be mediated by a service, e.g., provided by processing circuitry of computing system 20. Computing device(s) 12 and computing device(s) 14 may have a software application to report the locations of the computing devices to the service, which may determine which computing devices 14 are within the geofence, and deliver the alert to those computing devices 14.

The processing circuitry may similarly provide an alert to one or more computing devices 18 that are not necessarily within alert area 28. Computing devices 18 may be associated with users predetermined to be responders or caregivers either for patient 4 or the acute health event experienced by patient, such as treating clinicians, family members, first responders, or other caregivers.

The alert may provide a variety of information to assist the responders in responding to the acute health event for patient 4. For example, the alert may include the name or type of acute health event, at least one of a time of onset of the acute health event or an elapsed time of the acute health event, and/or at least a portion of the physiological data of patient 4 received in the message from IMD 10.

The alert may include the location of patient 4. In some examples, the alert may cause or enable computing device 14 to provide the responder directions to the location of patient 4.

In some examples, the alert includes treatment instructions for the health event, e.g., cardiopulmonary resuscitation (CPR) instructions. In some examples, the processing circuitry selects treatment instructions to include in the alert based on the acute health event and/or the physiological data included in the message from IMD 10.

In some examples, the alert comprises a location of a portable treatment device configured to treat the acute health event, such as an automated external defibrillator (AED) In some examples, the alert may cause or enable computing device 14 to provide the responder directions to the portable treatment device.

In some examples, in addition to the transmitted alerts, the processing circuitry may cause one or more computing devices 12 of patient 4 to provide an alert via their user interfaces. Such local alerts may be the same as or different than the transmitted alerts. The local alerts may be configured, e.g., audibly and/or visually, to attract the attention of patient 4 and/or any persons in close proximity to patient 4.

In some examples, patient 4 or a nearby caregiver may be able to provide alert cancellation input via the user interface of one or more computing devices 12. The processing circuitry may suspend or terminate the local alert in response to a cancellation. The processing circuitry may determine whether to transmit other alerts or take other actions therein based on not receiving a cancellation within a time interval from initiation of the local alert. In some examples, instead of or in addition to the transmitted alerts, the processing circuitry is configured to control a computing device 12 to place a telephonic call to EMS 22, e.g., to autodial 911. The call may be cancelled by patient 4 or a nearby caregiver via a user interface of the computing device 12.

In some examples, the processing circuitry is configured to perform an analysis to confirm the acute health event, and may deliver or withhold alerts and/or calls based on the analysis. The analysis may be of the physiological data received from IMB 10 and/or physiological data collected by a computing device 12 of patient 4, e.g., computing device 12B. In some examples, the processing circuitry, e.g., of computing devices 12 and/or computing system 20, may have greater processing capacity than IMD 10, enabling more complex analysis of physiological data. In some examples, the processing circuitry may apply the physiological data to a machine learning model or other artificial intelligence, e.g., to determine whether the physiological data is sufficiently indicative of the acute health event.

Although described herein in the context of example IMD 10, the techniques for cardiac arrhythmia detection disclosed herein may be used with other types of devices. For example, the techniques may be implemented with an extra-cardiac defibrillator coupled to electrodes outside of the cardiovascular system, a transcatheter pacemaker configured for implantation within the heart, such as the Micra™ transcatheter pacing system commercially available from Medtronic PLC of Dublin Ireland, a neurostimulator, or a drug delivery device.

Figure 2:
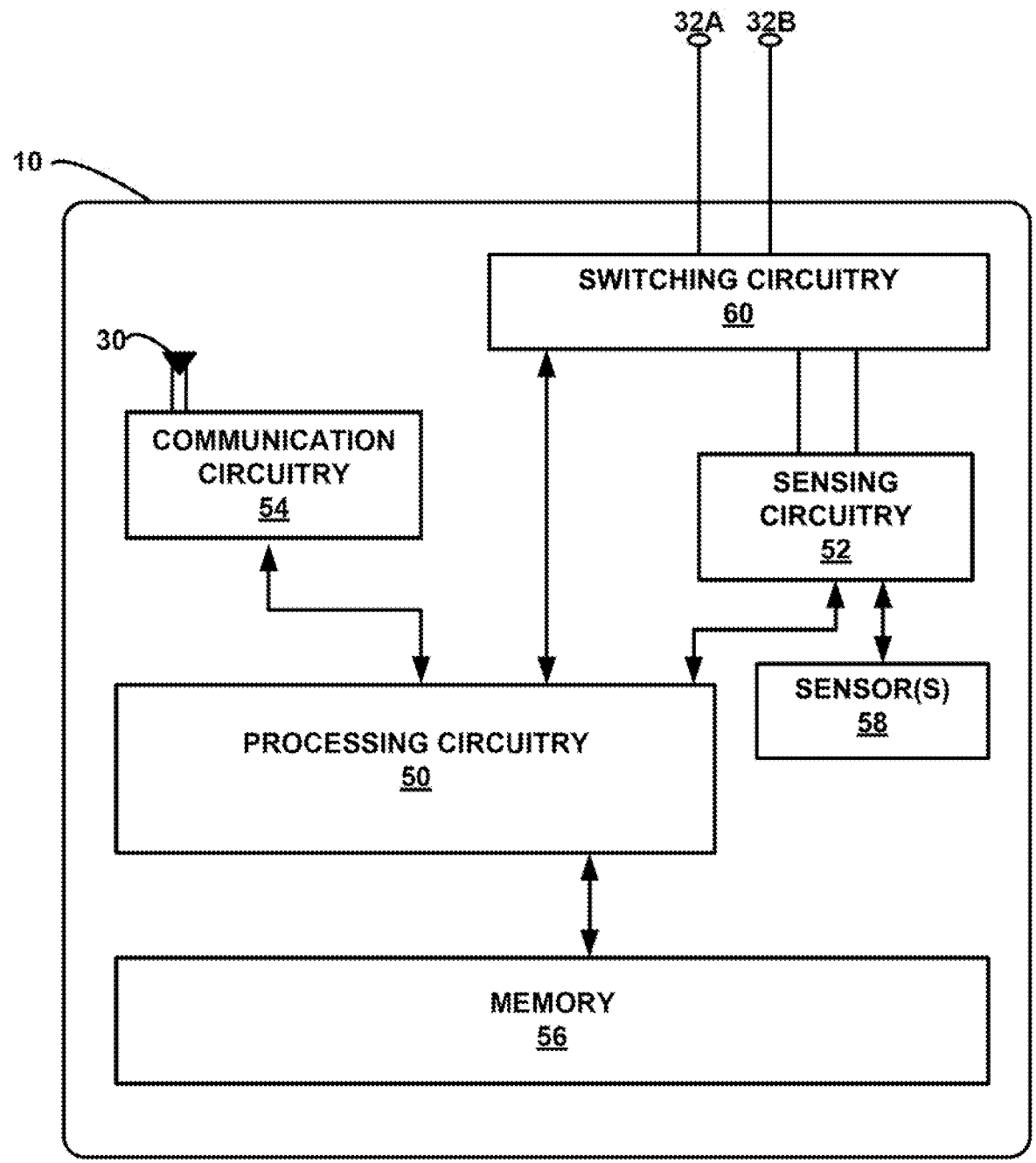
FIG. 2 is a block diagram illustrating an example configuration of the IMD of FIG. 1A.

FIG. 2 is a block diagram illustrating an example configuration of IMD 10 of FIG. 1A. As shown in FIG. 2, IMD 10 includes processing circuitry 50, sensing circuitry 52, communication circuitry 54, memory 56, sensors 58, switching circuitry 60, and electrodes 16A, 16B (hereinafter "electrodes 16"), one or more of which may be disposed on a housing of IMD 10. In some examples, memory 56 includes computer-readable instructions that, when executed by processing circuitry 50, cause IMD 10 and processing circuitry 50 to perform various functions attributed herein to IMB 10 and processing circuitry 50. Memory 56 may include any volatile, non-volatile, magnetic, optical, or electrical media, such as a random-access memory (RAM), read-only memory (ROM), non-volatile RAM (NVRAM), electrically-erasable programmable ROM (EEPROM), flash memory, or any other digital media.

Processing circuitry 50 may include fixed function circuitry and/or programmable processing circuitry. Processing circuitry 50 may include any one or more of a microprocessor, a controller, a digital signal processor (DSP), an application specific integrated circuit (ASIC), a field-programmable gate array (FPGA), or equivalent discrete or analog logic circuitry. In some examples, processing circuitry 50 may include multiple components, such as any combination of one or more microprocessors, one or more controllers, one or more DSPs, one or more ASICs, or one or more FPGAs, as well as other discrete or integrated logic circuitry. The functions attributed to processing circuitry 50 herein may be embodied as software, firmware, hardware, or any combination thereof.

Sensing circuitry 52 may be selectively coupled to electrodes 16A, 16B via switching circuitry 60 as controlled by processing circuitry 50. Sensing circuitry 52 may monitor signals from electrodes 16A, 16B in order to monitor electrical activity of a heart of patient 4 of FIG. 1A and produce ECG data for patient 4. In some examples, processing circuitry 50 may identify features of the sensed ECG, such as heart rate, heart rate variability, intra-beat intervals, and/or ECG morphologic features, to detect an episode of cardiac arrhythmia of patient 4. Processing circuitry 50 may store the digitized ECG and features of the ECG used to detect the arrhythmia episode in memory 56 as episode data for the detected arrhythmia episode.

In some examples, sensing circuitry 52 measures impedance, e.g., of tissue proximate to IMD 10, via electrodes 16. The measured impedance may vary based on respiration and a degree of perfusion or edema. Processing circuitry 50 may determine physiological data relating to respiration, perfusion, and/or edema based on the measured impedance.

In some examples, IMD 10 includes one or more sensors 58, such as one or more accelerometers, microphones, optical sensors, temperature sensors, and/or pressure sensors. In some examples, sensing circuitry 52 may include one or more filters and amplifiers for filtering and amplifying signals received from one or more of electrodes 16A, 16B and/or other sensors 58. In some examples, sensing circuitry 52 and/or processing circuitry 50 may include a rectifier, filter and/or amplifier, a sense amplifier, comparator, and/or analog-to-digital converter. Processing circuitry 50 may determine physiological data, e.g., values of physiological parameters of patient 4, based on signals from sensors 58, which may be stored in memory 56.

Processing circuitry 50 may detect an acute health event of patient 4 based on combination of one or more of the types of physiological data described herein. For example, processing circuitry 50 may detect a cardiac arrest, a ventricular fibrillation, a ventricular tachycardia, or a myocardial infarction based on an ECG and/or other physiological data indicating the electrical or mechanical activity of heart 6 of patient 4 (FIG. 1A). In some examples, processing circuitry 50 may detect stroke based on such cardiac activity data. In some examples, sensing circuitry 52 may detect brain activity data, e.g., an electroencephalogram (EEG) via electrodes 16, and processing circuitry 50 may detect stroke or a seizure based on the brain activity alone, or in combination with cardiac activity data or other physiological data. In some examples, processing circuitry 50 detects whether the patient has fallen based on data from an accelerometer alone, or in combination with other physiological data.

In some examples, processing circuitry 50 transmits, via communication circuitry 54, the physiological data for an episode to a computing device 12 (FIG. 1). Such transmissions may occur on a daily or other basis. In some examples, when the episode is an acute health event, processing circuitry 50 transmits to one or more computing devices 12, via communication circuitry 54, a message indicating the acute health event, as described herein. Transmission of the message may occur on an ad hoc basis and as quickly as possible. Communication circuitry 54 may include any suitable hardware, firmware, software, or any combination thereof for communicating with another device, such as computing devices 12, with the aid of an internal or external antenna, e.g., antenna 30.

Figure 3:
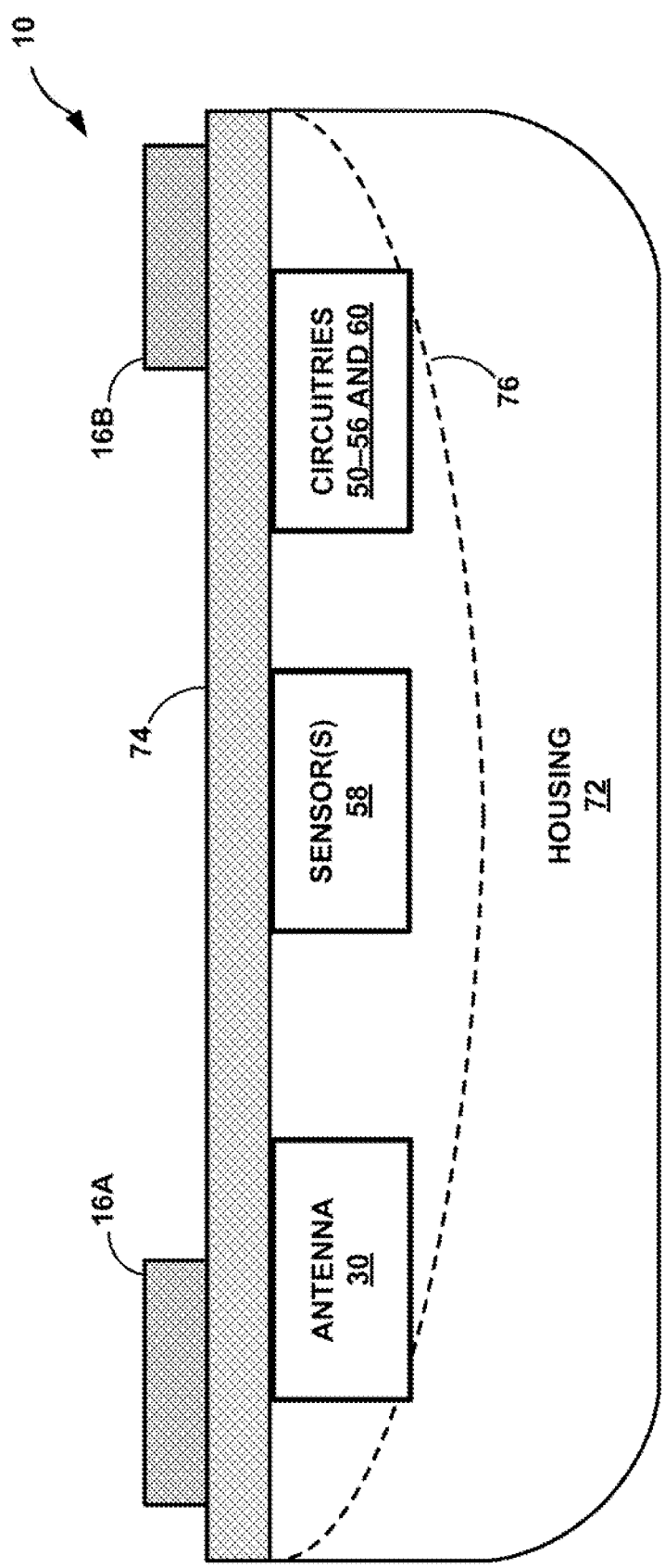
FIG. 3 is a conceptual side-view diagram illustrating an example configuration of the IMD of FIGS. 1A and 2.

FIG. 3 is a conceptual side-view diagram illustrating an example configuration of IMD 10. In the example shown in FIG. 3, IMD 10 may include a leadless, subcutaneously-implantable monitoring device having a housing 72 and an insulative cover 74. Electrode 16A and electrode 16B may be formed or placed on an outer surface of cover 74. Circuitries 50-56 and 60, described above with respect to FIG. 2, may be formed or placed on an inner surface of cover 74, or within housing 72. In the illustrated example, antenna 30 is formed or placed on the inner surface of cover 74, but may be formed or placed on the outer surface in some examples. Sensors 58 may also be formed or placed on the inner or outer surface of cover 74 in some examples. In some examples, insulative cover 74 may be positioned over an open housing 18 such that housing 72 and cover 74 enclose antenna 30, sensors 58, and circuitries 50-56 and 60, and protect the antenna and circuitries from fluids such as body fluids.

One or more of antenna 30, sensors 58, or circuitries 50-56 may be formed on insulative cover 74, such as by using flip-chip technology. Insulative cover 74 may be flipped onto a housing 72. When flipped and placed onto housing 72, the components of IMB 10 formed on the inner side of insulative cover 74 may be positioned in a gap 76 defined by housing 72. Electrodes 16 may be electrically connected to switching circuitry 60 through one or more vias (not shown) formed through insulative cover 74. Insulative cover 74 may be formed of sapphire (i.e., corundum), glass, parylene, and/or any other suitable insulating material. Housing 72 may be formed from titanium or any other suitable biomaterial (e.g., a biocompatible material). Electrodes 16 may be formed from any of stainless steel, titanium, platinum, iridium, or alloys thereof. In addition, electrodes 16 may be coated with a material such as titanium nitride or fractal titanium nitride, although other suitable materials and coatings for such electrodes may be used.

Figure 4:
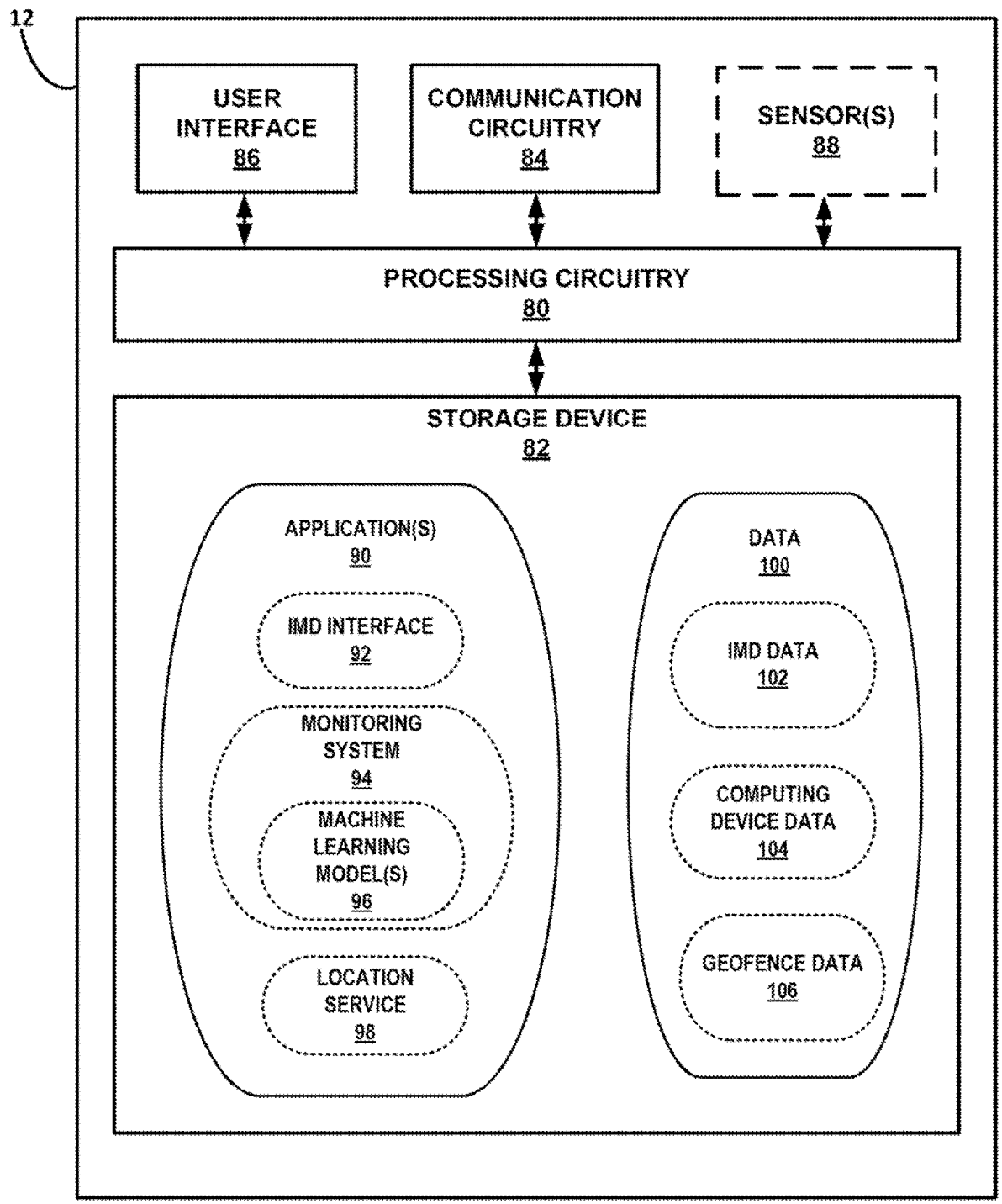
FIG. 4 is a block diagram illustrating an example configuration of a computing device that operates in accordance with one or more techniques of the present disclosure.

FIG. 4 is a block diagram illustrating an example configuration of a computing device 12 of patient 4, which may correspond to either (or both operating in coordination) of computing devices 12A and 12B illustrated in FIG. 1A. In some examples, external device 12 takes the form of a smartphone, a laptop, a tablet computer, a personal digital assistant (PDA), a smartwatch or other wearable computing device, smart home appliance, such as a smart speaker, or any IoT device. As shown in the example of FIG. 4, computing device 12 includes processing circuitry 80, storage device 82, communication circuitry 84, a user interface 86 and, in some examples, one or more sensors 88. Although shown in FIG. 4 as a stand-alone device for purposes of example, computing device 12 may be any component or system that includes processing circuitry or other suitable computing environment for executing software instructions and, for example, need not necessarily include one or more elements shown in FIG. 4 (e.g., in some examples components such as storage device 82 may not be co-located or in the same chassis as other components).

Processing circuitry 80, in one example, is configured to implement functionality and/or process instructions for execution within computing device 12. For example, processing circuitry 80 may be capable of processing instructions, including applications 90, stored in storage device 82. Examples of processing circuitry 80 may include, any one or more of a microprocessor, a controller, a digital signal processor (DSP), an application specific integrated circuit (ASIC), a field-programmable gate array (FPGA), or equivalent discrete or integrated logic circuitry.

Storage device 82 may be configured to store information within computing device 12, including applications 90 and data 100. Storage device 82, in some examples, is described as a computer-readable storage medium. In some examples, storage device 82 includes a temporary memory or a volatile memory. Examples of volatile memories include random access memories (RAM), dynamic random access memories (DRAM), static random access memories (SRAM), and other forms of volatile memories known in the art. Storage device 82, in one example, is used by applications 90 running on computing device 12 to temporarily store information during program execution. Storage device 82, in some examples, also includes one or more memories configured for long-term storage of information, e.g. including non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 12 utilizes communication circuitry 84 to communicate with other devices, such as IMD 10, other computing devices 12, and computing system 20 of FIG. 1B. Communication circuitry 84 may include a network interface card, such as an Ethernet card, an optical transceiver, a radio frequency transceiver, or any other type of device that can send and receive information. Other examples of such network interfaces may include 3G, 4G, 5G, and WiFi radios.

Computing device 12 also includes a user interface 86. User interface 86 may be configured to provide output to a user using tactile, audio, or video stimuli and receive input from a user through tactile, audio, or video feedback. User interface 86 may include, as examples, a presence-sensitive display, a mouse, a keyboard, a voice responsive system, video camera, microphone, or any other type of device for detecting a command from a user, a sound card, a video graphics adapter card, or any other type of device for converting a signal into an appropriate form understandable to humans or machines, a speaker, a cathode ray tube (CRT) monitor, a liquid crystal display (LCD), or any other type of device that can generate intelligible output to a user. In some examples, a presence-sensitive display includes a touch-sensitive screen.

Example applications 90 executable by processing circuitry 80 of computing device 12 include an IMD interface application 92, a monitoring system 94 that may utilize one or more machine learning models 96, and a location service 98. Execution of IMB interface 92 by processing circuitry 80 configures computing device 12 to interface with IMD 10. For example, IMD interface 92 configures computing device 12 to communicate with IMD 10 via communication circuitry 84. Processing circuitry 80 may receive physiological data of patient 4 from IMD 10, and store the physiological data as IMD data 102 in memory 82. In some examples, processing circuitry 80 receives physiological data from IMD 10 with a message indicating an acute health event. IMB interface 92 also configures user interface 86 for a user to interact with IMD 10 and/or IMD data 102.

Processing circuitry 80 may execute monitoring system 94 to facilitate monitoring the health of patient 4, e.g., based on IMD data 102 10 and/or data collected by computing device 12. Monitoring system 94 may cause processing circuitry 80 and computing device 12 to perform any of the techniques described herein related to responding to detection of an acute health event by IMD 10.

Processing circuitry 80 may execute location service 98 to determine the location of computing device 12 and, thereby, the presumed location of patient 4. Processing circuitry 80 may use global position system (GPS) data, multilateration, and/or any other known techniques for locating computing devices. In some examples, monitoring system 94 may use the location of patient 4 and geofence data to determine an alert area 88 as a geofence. Geofence area 106 may include different geofence distances from patient for different acute health events or different patient locations with different expected population densities, and monitoring system 94 may select a geofence distance based on such parameters.

In some examples, as illustrated in FIG. 4, computing device may include one or more sensor(s) 88 for sensing physiological parameters or signals of patient 4. Sensor(s) 88 may include electrodes and other sensors, and sensing circuitry (e.g., including an ADC), as described above with respect to IMB 10 and FIG. 2. Processing circuitry 80 may store physiological data from sensors 88 as computing device data 104 in storage device 82.

As examples, computing device data 104 may include one or more of: activity levels, walking/running distance, resting energy, active energy, exercise minutes, quantifications of standing, body mass, body mass index, heart rate, low, high, and/or irregular heart rate events, heart rate variability, walking heart rate, heart beat series, digitized ECG, blood oxygen saturation, blood pressure (systolic and/or diastolic), respiratory rate, maximum volume of oxygen, blood glucose, peripheral perfusion, and sleep patterns.

Processing circuitry 80 may also receive user recorded health data via user interface 86 and store such data as computing device data 104. User recorded health data may include one or more of: exercise and activity data, sleep data, symptom data, medical history data, quality of life data, nutrition data, medication taking or compliance data, allergy data, demographic data, weight, and height. Medical history data may relate to history of cardiac arrest, tachyarrhythmia, myocardial infarction, stroke, seizure, chronic obstructive pulmonary disease (COPD), renal dysfunction, or hypertension, history of procedures, such as ablation or cardioversion, and healthcare utilization.

In some examples, processing circuitry 80 executes monitoring system 94 to perform an analysis to confirm an acute health event detected by IMD 10, and delivers or withhold alerts and/or calls based on the analysis. The analysis may be of IMD data 102 and/or computing device data 104. In some examples, monitoring system 94 applies the data to one or more machine learning model(s) 96, other artificial intelligence, or other models or algorithms that do not necessarily require machine learning, such as linear regression, trend analysis, decision trees, or thresholds, to determine whether the data is sufficiently indicative of the acute health event to confirm its occurrence.

Figure 5:
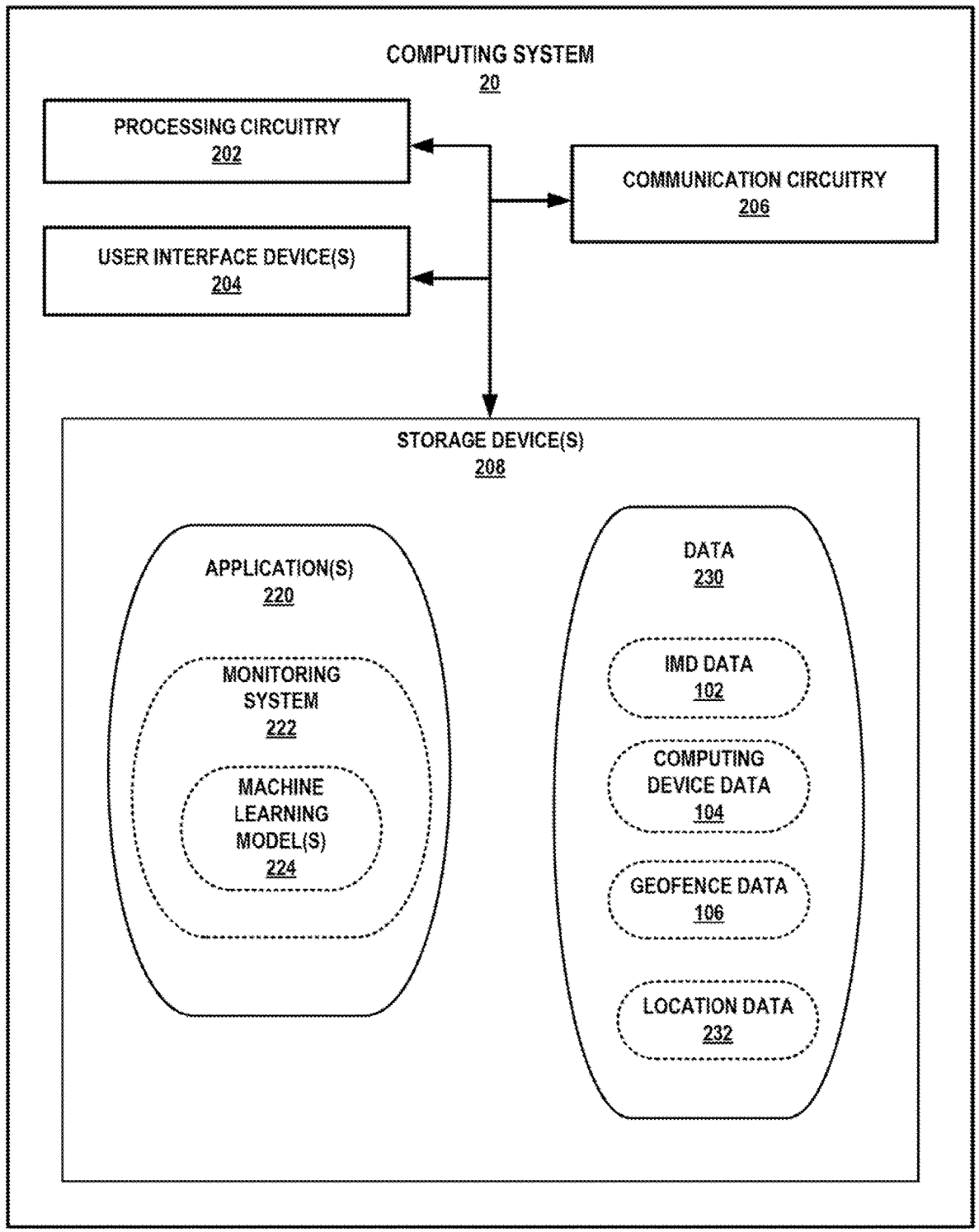
FIG. 5 is a block diagram illustrating an example configuration of a computing system that operates in accordance with one or more techniques of the present disclosure.

FIG. 5 is a block diagram illustrating an example configuration of computing system 20. Computing system 20 may be any component or system that includes processing circuitry or other suitable computing environment for executing software instructions and, for example, need not necessarily include one or more elements shown in FIG. 5 (e.g., user interface devices 204, communication circuitry 206; and in some examples components such as storage device(s) 208 may not be co-located or in the same chassis as other components). In some examples, computing system 20 may be a cloud computing system distributed across a plurality of devices.

In the example of FIG. 5, computing system 24 includes processing circuitry 202, one or more user interface (UI) devices 204, communication circuitry 206, and one or more storage devices 208. Computing system 20, in some examples, further includes one or more application(s) 220 such as monitoring system 222, that are executable by computing system 20.

Processing circuitry 202, in one example, is configured to implement functionality and/or process instructions for execution within computing system 20. For example, processing circuitry 202 may be capable of processing instructions stored in storage device 208. Examples of processing circuitry 202 may include any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within computing device 20 during operation. Storage device 208, in some examples, is described as a computer-readable storage medium. In some examples, storage device 208 is a temporary memory, meaning that a primary purpose of storage device 208 is not long-term storage. Storage device 408, in some examples, is described as a volatile memory, meaning that storage device 408 does not maintain stored contents when the computer is turned off. Examples of volatile memories include random access memories (RAM), dynamic random access memories (DRAM), static random access memories (SRAM), and other forms of volatile memories known in the art. In some examples, storage device 208 is used by software or applications 220 running on computing system 20 to temporarily store information during program execution.

Storage devices 208 may further be configured for long-term storage of information, such as applications 220 and data 230. In some examples, storage devices 208 include non-volatile storage elements. Examples of such non-volatile storage elements include magnetic hard discs, optical discs, floppy discs, flash memories, or forms of electrically programmable memories (EPROM) or electrically erasable and programmable memories (EEPROM).

Computing system 20, in some examples, also includes communication circuitry 206 to communicate with other devices and systems, such as computing devices 12 of FIGS. 1A and 1B. Communication circuitry 206 may include a network interface card, such as an Ethernet card, an optical transceiver, a radio frequency transceiver, or any other type of device that can send and receive information. Other examples of such network interfaces may include 3G, 4G, 5G, and WiFi radios.

Computing system 20, in one example, also includes one or more user interface devices 204. User interface devices 204, in some examples, may be configured to provide output to a user using tactile, audio, or video stimuli and receive input from a user through tactile, audio, or video feedback. User interface devices 204 may include, as examples, a presence-sensitive display, a mouse, a keyboard, a voice responsive system, video camera, microphone, or any other type of device for detecting a command from a user, a sound card, a video graphics adapter card, or any other type of device for converting a signal into an appropriate form understandable to humans or machines, a speaker, a cathode ray tube (CRT) monitor, a liquid crystal display (LCD), or any other type of device that can generate intelligible output to a user.

Applications 220 may include program instructions and/or data that are executable by processing circuitry 202 of computing system 20 to cause computing system 20 to provide the functionality ascribed to it herein. Example application(s) 220 may include monitoring system 222. Other additional applications not shown may alternatively or additionally be included to provide other functionality described herein and are not depicted for the sake of simplicity.

In accordance with the techniques of the disclosure, computing system 20 receives IMD data 102 and computing device data 104 from computing device 12 via communication circuitry 206. Computing system 20 may also receive location data 232 indicating a location of patient 4 from computing device 12 via communication circuitry 206. Processing circuitry 202 stores these, as well as geofence data 106, as data 230 in storage devices 208. Processing circuitry 202 may execute monitoring system 222. Monitoring system 222 may be the same as monitoring system 94 of computing device 12, e.g., computing device 12 may primarily relay messages and data to computing system 20 for performance of the techniques described herein, or may operate in combination with monitoring system 94 to facilitate any of the functionality described herein.

Figure 6:
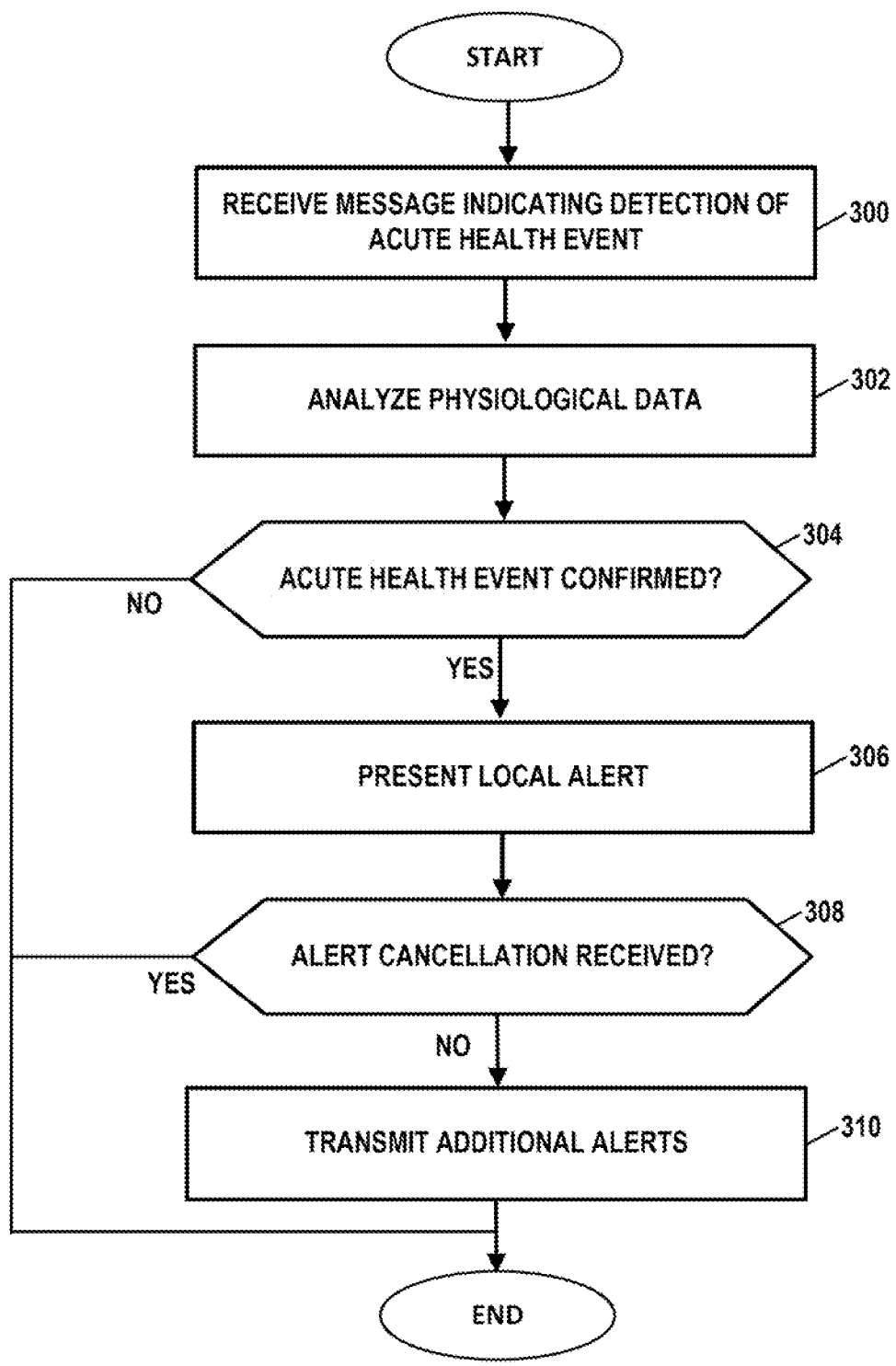
FIG. 6 is a flow diagram illustrating an example technique for providing alerts in response to detection of an acute health event of a patient.

FIG. 6 is a flow diagram illustrating an example technique for providing alerts in response to detection of an acute health event of a patient. The example technique of FIG. 6 is described as being implemented by processing circuitry 80 of computing device 12, e.g., implementing monitoring system 94. In some examples, processing circuitry 202 of computing system 20 may implement monitoring system 222 to perform some or all of the functions of the example technique.

According to the example illustrated by FIG. 6, processing circuitry 80 receives a wirelessly-transmitted message from IMD 10 indicating that patient 4 has experienced an acute health event (300). Processing circuitry 80 analyzes physiological data in response to the message (302). The physiological data may include IMD data 102 received from IMD 10, e.g., as part of the message, and/or computing device data 104. Computing device data 104 may be sensed by the computing device executing the example technique if the computing device is configured to do so, or by another computing device 12. For example, computing device 12A of FIG. 1A, e.g., a smartphone, may implement the example technique of FIG. 6, and receive computing device data 104 from computing device 12B, e.g., a smartwatch or other wearable sensing and computing device. The analysis may include application of the physiological data to a machine learning model, other artificial intelligence, or other models or algorithms that do not necessarily require machine learning, such as linear regression, trend analysis, decision trees, or thresholds.

If processing circuitry 80 determines that the acute health event is not confirmed by the analysis (NO of 304), the example technique may end. If processing circuitry 80 determines that the acute health event is confirmed by the analysis (YES of 304), processing circuitry 80 may present a local alert via user interface 86 of computing device 12 (306). Processing circuitry 80 may start a timer. Processing circuitry 80 may determine whether user input cancelling the alert is received via user interface within a predetermined time interval from initiation of the alert (308). If processing circuitry 80 determines that the alert cancellation input is received within the predetermined time interval (YES of 308), the local alert may be stopped and the example technique may end. If processing circuitry 80 determines that the alert cancellation input is not received within the predetermined time interval (NO of 308), processing circuitry 80 may transmit alerts, call EMS, and/or take any other actions described herein. For example, processing circuitry 80 may transmit alerts to one or more computing devices 14 of one or more potential responders in an alert area 88, and to one or more computing devices 18 of family or caregivers of patient 4.

Figure 7:
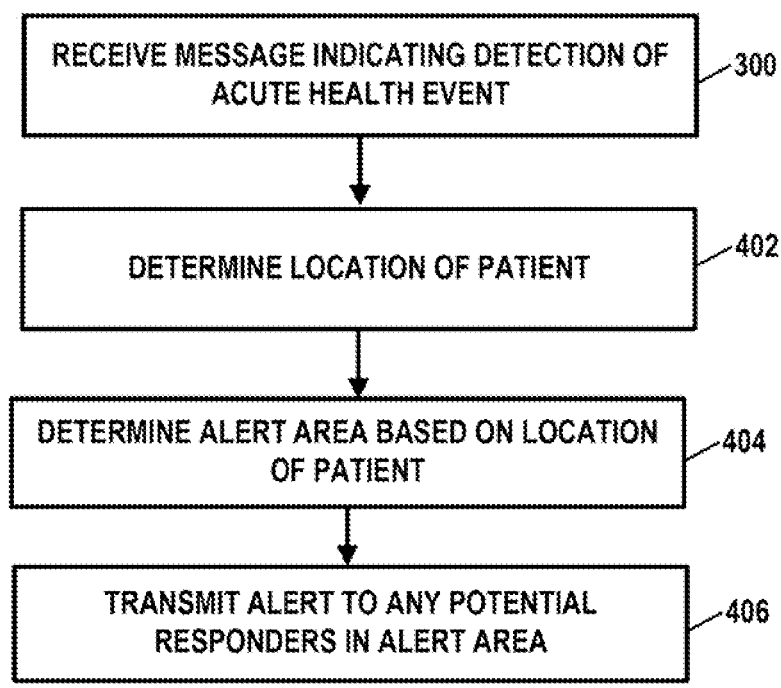
FIG. 7 is a flow diagram illustrating an example technique for transmitting an alert to potential responders within an alert area.

FIG. 7 is a flow diagram illustrating an example technique for transmitting an alert to one or more computing devices 14 of potential responders within alert area 88. According to the example illustrated by FIG. 7, processing circuitry 80 of computing device 12 receives a wirelessly-transmitted message from IMD 10 indicating that patient 4 has experienced an acute health event (300). In response to the message, processing circuitry 80 determines a location of patient 4, e.g., by executing location service 98 (402).

Processing circuitry 80 of computing device 12 and/or processing circuitry 202 of computing system 20 determines alert area 28 based on the location of patient 4 (404). Processing circuitry 80 and/or processing circuitry 202 transmits an alert to one or more computing devices 14 of any one or more potential responders in alert area 28 (406).

In some examples, to determine the alert area, the processing circuitry is configured to identify, based on the location of patient 4, at least one of: one or more cellular base stations 24 or one or more wireless access points (WAPs) 26 that are within (or whose coverage areas are within) a threshold distance of the location of patient 4. The processing circuitry may be configured to control transmission of the alert to any one or more computing devices 14 in communication with the one or more cellular base stations or wireless access points.

In some examples, to determine the alert area, the processing circuitry is configured to determine a geofence based on the location of patient 4 and geofence data 106. The processing circuitry may be configured to control transmission of the alert to any one or more computing devices 14 within the geofence. This technique for sending alerts to computing devices 14 within alert area 28 may be facilitated by monitoring system 222 executed by processing circuitry 202 of computing system 20. Computing device(s) 12 and computing device(s) 14 may have a software application to report the locations of the computing devices to monitoring system 222, which may determine which computing devices 14 are within the geofence, and deliver the alert to those computing devices 14.

Example 1. A system comprising processing circuitry configured to: receive a wirelessly-transmitted message from a medical device, the message indicating that the medical device detected an acute health event of the patient; and in response to the message: determine a location of the patient; determine an alert area based on the location of the patient; and control transmission of an alert of the acute heath event of the patient to any one or more computing devices of one or more potential responders within the alert area.

Example 2. The system of Example of 1, wherein the medical device comprises an implantable medical device.

Example 3. The system of Examples 1 or 2, wherein the processing circuitry comprises processing circuitry of a computing device of the patient.

Example 4. The system of Example 3, wherein the computing device of the patient comprises at least one of a smartphone, smartwatch, smart appliance, or an Internet of Things device.

Example 5. The system of any of Examples 1-4, wherein the acute health event comprises at least one of a cardiac arrest, a ventricular fibrillation, a ventricular tachycardia, a myocardial infarction, a stroke, a seizure, or a fall.

Example 6. The system of any of Examples 1-5, wherein the alert comprises at least one of a time of onset of the acute health event or an elapsed time of the acute health event.

Example 7. The system of any of Examples 1-6, wherein the message comprises physiological data of the patient collected by the medical device, wherein alert comprises at least a portion of the physiological data.

Example 8. The system of any of Examples 1-7, wherein the alert comprises the location of the patient.

Example 9. The system of any of Examples 1-8, wherein the processing circuitry is configured to select treatment instructions based on the acute health event, wherein the alert comprises treatment instructions.

Example 10. The system of any of Examples 1-9, wherein the alert comprises a location of a portable treatment device configured to treat the acute health event.

Example 11. The system of Example 10, wherein the portable treatment device comprises an automated external defibrillator (AED).

Example 12. The system of any of Examples 1-11, wherein, to determine the alert area, the processing circuitry is configured to identify, based on the location of the patient, at least one of: one or more cellular base stations or one or more wireless access points, and wherein, to control transmission of the alert to any one or more computing devices of one or more potential responders within the alert area, the processing circuitry is configured to control transmission of the alert to any one or more computing devices in communication with the one or more cellular base stations or wireless access points.

Example 13. The system of any of Examples 1-12, wherein, to determine the alert area, the processing circuitry is configured to determine a geofence based on the location of the patient, and wherein, to control transmission of the alert to any one or more computing devices of one or more potential responders within the alert area, the processing circuitry is configured to control transmission of the alert to any one or more computing devices within the geofence.

Example 14. The system of any of Examples 1-13, wherein the processing is further configured to control transmission of the alert of the acute heath event of the patient to any one or more computing devices of one or more caregivers or family members of the patient.

Example 15. The system of Example 3 in combination with any of Examples 4-13, wherein the alert comprises a first alert, and the processing circuitry is configured to control a user interface of the computing device of the patient to present a second alert.

Example 16. The system of Example 15, wherein the processing circuitry is configured to: determine whether an alert cancellation is received via the user interface within a time interval from presentation of the second alert; and control transmission of the first alert based on determining that the alert cancellation is not received within the time interval.

Example 17. The system of Example 3 in combination with any of Examples 4-16, wherein the processing circuitry is configured to control the computing device of the patient to place a telephonic call to an emergency medical service.

Example 18. The system of Examples 16 and 17, wherein the processing circuitry is configured to control the computing device to place the telephonic call to the emergency medical service based on determining that the alert cancellation is not received within the time interval.

Example 19. The system of Example 3 in combination with any of Examples 4-18, wherein the message comprises physiological data of the patient collected by the medical device, and the processing circuitry is configured to: analyze the physiological data; and determine whether to control transmission of the alert based on the analysis.

Example 20. The system of Example 19, wherein the physiological data of the patient collected by the medical device comprises first physiological data of the patient, wherein the computing device of the patient is configured to collect second physiological data of the patient, and wherein, to analyze the physiological data, the processing circuitry is configured to analyze the first and second physiological data of the patient.

Example 21. A method comprising, by processing circuitry: receiving a wirelessly-transmitted message from a medical device, the message indicating that the medical device detected an acute health event of the patient; and in response to the message: determining a location of the patient; determining an alert area based on the location of the patient; and controlling transmission of an alert of the acute heath event of the patient to any one or more computing devices of one or more potential responders within the alert area.

Example 22. The method of Example 21, wherein the medical device comprises an implantable medical device.

Example 23. The method of Example 21 or 22, wherein the processing circuitry comprises processing circuitry of a computing device of the patient.

Example 24. The method of Example 23, wherein the computing device of the patient comprises at least one of a smartphone, smartwatch, smart appliance, or an Internet of Things device.

Example 25. The method of any of Examples 21-24, wherein the acute health event comprises at least one of a cardiac arrest, a ventricular fibrillation, a ventricular tachycardia, a myocardial infarction, a stroke, a seizure, or a fall.

Example 26. The method of any of Examples 21-25, wherein the alert comprises at least one of a time of onset of the acute health event or an elapsed time of the acute health event.

Example 27. The method of any of Examples 21-26, wherein the message comprises physiological data of the patient collected by the medical device, wherein alert comprises at least a portion of the physiological data.

Example 28. The method of any of Examples 21-27, wherein the alert comprises the location of the patient.

Example 29. The method of any of Examples 21-28, further comprising selecting treatment instructions based on the acute health event, wherein the alert comprises treatment instructions.

Example 30. The method of any of Examples 21-29, wherein the alert comprises a location of a portable treatment device configured to treat the acute health event.

Example 31. The method of Example 30, wherein the portable treatment device comprises an automated external defibrillator (AED)

Example 32. The method of any of Examples 21-31, wherein determining the alert area comprises identifying, based on the location of the patient, at least one of: one or more cellular base stations or one or more wireless access points, and wherein controlling the transmission of the alert to any one or more computing devices of one or more potential responders within the alert area comprises controlling transmission of the alert to any one or more computing devices in communication with the one or more cellular base stations or wireless access points.

Example 33. The method of any of Examples 21-32, wherein determining the alert area comprises determining a geofence based on the location of the patient, and wherein controlling transmission of the alert to any one or more computing devices of one or more potential responders within the alert area comprises controlling transmission of the alert to any one or more computing devices within the geofence.

Example 34. The method of any of Examples 21-33, further comprising controlling transmission of the alert of the acute heath event of the patient to any one or more computing devices of one or more caregivers or family members of the patient.

Example 35. The method of Example 23 in combination with any of Examples 24-33, wherein the alert comprises a first alert, and the and the method further comprises controlling a user interface of the computing device of the patient to present a second alert.

Example 36. The method of Example 35, further comprising: determining whether an alert cancellation is received via the user interface within a time interval from presentation of the second alert; and controlling transmission of the first alert based on determining that the alert cancellation is not received within the time interval.

Example 37. The method of Example 23 in combination with any of Examples 24-36, further comprising controlling the computing device of the patient to place a telephonic call to an emergency medical service.

Example 38. The method of Examples 36 and 37, wherein controlling the computing device of the patient to place the telephonic call to the emergency medical service comprises controlling the computing device to place the telephonic call to the emergency medical service based on determining that the alert cancellation is not received within the time interval.

Example 39. The method of Example 23 in combination with any of Examples 24-38, wherein the message comprises physiological data of the patient collected by the medical device, the method further comprising: analyzing the physiological data; and determining whether to control transmission of the alert based on the analysis.

Example 40. The method of Example 39, wherein the physiological data of the patient collected by the medical device comprises first physiological data of the patient, wherein the computing device of the patient is configured to collect second physiological data of the patient, and wherein analyzing the physiological data comprises analyzing the first and second physiological data of the patient.

Example 41. A method comprising any combination of the Example methods described herein.

Example 42. A system comprising processing circuitry configured to perform the method of any one or more of Examples 21-41.

Example 43. A non-transitory computer readable storage medium comprising program instructions configured to cause processing circuitry to perform the method of any one or more of Examples 21-41.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module, unit, or circuit for purposes of clarity, it should be understood that the techniques of this disclosure may be performed by a combination of units, modules, or circuitry associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein may refer to any of the foregoing structure or any other physical structure suitable for implementation of the described techniques. Also, the techniques could be fully implemented in one or more circuits or logic elements.

Various examples have been described. These and other examples are within the scope of the following claims.

What is claimed is:

1. A system comprising processing circuitry configured to:
   receive a wirelessly-transmitted message from an implanted medical device, the message indicating that the implanted medical device detected an acute health event of a patient; and
   in response to the message:
   determine a location of the patient;
   determine an alert area based on the location of the patient;
   select treatment instructions based on the acute health event; and
   control transmission of an alert of the acute heath event of the patient to any one or more computing devices of one or more potential responders within the alert area, wherein the alert comprises the selected treatment instructions.

2. The system of claim 1, wherein the processing circuitry comprises processing circuitry of a computing device of the patient.

3. The system of claim 2, wherein the computing device of the patient comprises at least one of a smartphone, smartwatch, smart appliance, or an Internet of Things device.

4. The system of claim 1, wherein the acute health event comprises at least one of a cardiac arrest, a ventricular fibrillation, a ventricular tachycardia, a myocardial infarction, a stroke, a seizure, or a fall.

5. The system of claim 1, wherein the alert comprises at least one of a time of onset of the acute health event or an elapsed time of the acute health event.

6. The system of claim 1, wherein the message comprises physiological data of the patient collected by the implanted medical device, wherein the alert comprises at least a portion of the physiological data.

7. The system of claim 1, wherein the alert comprises the location of the patient.

8. The system of claim 1, wherein the alert comprises a location of a portable treatment device configured to treat the acute health event.

9. The system of claim 8, wherein the portable treatment device comprises an automated external defibrillator (AED).

10. The system of claim 1,
    wherein, to determine the alert area, the processing circuitry is configured to identify, based on the location of the patient, at least one of: one or more cellular base stations or one or more wireless access points, and
    wherein, to control transmission of the alert to any one or more computing devices of one or more potential responders within the alert area, the processing circuitry is configured to control transmission of the alert to any one or more computing devices in communication with the one or more cellular base stations or wireless access points.

11. The system of claim 1,
    wherein, to determine the alert area, the processing circuitry is configured to determine a geofence based on the location of the patient, and
    wherein, to control transmission of the alert to any one or more computing devices of one or more potential responders within the alert area, the processing circuitry is configured to control transmission of the alert to any one or more computing devices within the geofence.

12. The system of claim 1, wherein the processing circuitry is further configured to control transmission of the alert of the acute heath event of the patient to any one or more computing devices of one or more caregivers or family members of the patient.

13. A method comprising, by processing circuitry:
    receiving a wirelessly-transmitted message from an implanted medical device, the message indicating that the implanted medical device detected an acute health event of a patient; and
    in response to the message:
    determining a location of the patient;
    determining an alert area based on the location of the patient;
    selecting treatment instructions based on the acute health event; and
    controlling transmission of an alert of the acute heath event of the patient to any one or more computing devices of one or more potential responders within the alert area, wherein the alert comprises the selected treatment instructions.

14. The method of claim 13,
    wherein determining the alert area comprises identifying, based on the location of the patient, at least one of: one or more cellular base stations or one or more wireless access points, and
    wherein controlling the transmission of the alert to any one or more computing devices of one or more potential responders within the alert area comprises controlling transmission of the alert to any one or more computing devices in communication with the one or more cellular base stations or wireless access points.

15. The method of claim 13,
wherein determining the alert area comprises determining a geofence based on the location of the patient, and
wherein controlling transmission of the alert to any one or more computing devices of one or more potential responders within the alert area comprises controlling transmission of the alert to any one or more computing devices within the geofence.

16. The method of claim 13, further comprising controlling transmission of the alert of the acute heath event of the patient to any one or more computing devices of one or more caregivers or family members of the patient.

17. The method of claim 13, wherein the processing circuitry comprises processing circuitry of a computing device of the patient.

18. A system comprising:
an implanted medical device configured to:
sense physiological data of a patient; and
detect an acute health event of the patient based on the sensed physiological data; and
processing circuitry configured to:
receive a wirelessly-transmitted a message from the implanted medical device, the message indicating that the implanted medical device detected the acute health event of the patient, wherein the message comprises at least a portion of the sensed physiological data; and
in response to the message:
determine a location of the patient;
determine an alert area based on the location of the patient;
select treatment instructions based on at least some of the portion of the sensed physiological data; and
control transmission of an alert of the acute heath event of the patient to any one or more computing devices of one or more potential responders within the alert area, wherein the alert comprises the treatment instructions.

\* \* \* \* \*